(12) United States Patent
Horvitz

(10) Patent No.: US 8,086,672 B2
(45) Date of Patent: Dec. 27, 2011

(54) WHEN-FREE MESSAGING

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1283 days.

(21) Appl. No.: 10/882,009

(22) Filed: Jun. 30, 2004

(65) Prior Publication Data

US 2004/0254998 A1 Dec. 16, 2004

Related U.S. Application Data

(63) Continuation-in-part of application No. 10/611,491, filed on Jun. 30, 2003, which is a continuation-in-part of application No. 09/881,502, filed on Jun. 14, 2001.

(60) Provisional application No. 60/450,841, filed on Feb. 28, 2003, provisional application No. 60/212,296, filed on Jun. 17, 2000.

(51) Int. Cl.
*G06F 15/173* (2006.01)

(52) U.S. Cl. ......................................... 709/206; 709/224

(58) Field of Classification Search .................. 709/206, 709/207, 224
See application file for complete search history.

(56) References Cited

U.S. PATENT DOCUMENTS

| | | |
|---|---|---|
| 4,789,962 A | 12/1988 | Berry et al. |
| 5,377,354 A | 12/1994 | Scannell et al. |
| 5,423,043 A | 6/1995 | Fitzpatrick et al. |
| 5,471,399 A | 11/1995 | Tanaka et al. |
| 5,493,692 A | 2/1996 | Theimer et al. |
| 5,508,817 A | 4/1996 | Kunigami |
| 5,544,321 A | 8/1996 | Theimer et al. |
| 5,555,346 A | 9/1996 | Gross et al. |

(Continued)

FOREIGN PATENT DOCUMENTS

EP 0413537 A2 2/1991

(Continued)

OTHER PUBLICATIONS

T. Joachims, Text categorization with support vector machines: learning with many relevant features, Machine Learning, European Conference on Machine Learning, Apr. 21, 1998, pp. 137-142.

(Continued)

*Primary Examiner* — Ario Etienne
*Assistant Examiner* — El Hadji Sall
(74) *Attorney, Agent, or Firm* — Merchant & Gould P.C.

(57) ABSTRACT

The present invention relates to systems and methods that mitigate the intrusiveness of communications between message senders and receivers while facilitating more courteous, seamless, and timely interactions. In one aspect, instant messaging and other forms of communications, such as push-to-talk voice communications, can be improved via employment of time-bounded policies and parameters. When-Free communications allows users to send When-Free messages, that act as near-instant messages that wait until a user or recipient is not in one of a list of states defined as busy or unavailable states. A sender can encode, with a quick gesture or via a standing profile, how long a message is to remain alive before being erased or retracted, or shifted to another communication modality. When-Free variants enable recipients to define policies for handling messages if unavailability persists beyond some time threshold, including the generation of automated responses and the shifting of instant messages to email communications, by moving the conversational thread to an email inbox for later review and response via email or to launch an instant message session that continues where the communication left off.

28 Claims, 14 Drawing Sheets

U.S. PATENT DOCUMENTS

| | | | |
|---|---|---|---|
| 5,555,376 A | 9/1996 | Theimer et al. | |
| 5,603,054 A | 2/1997 | Theimer et al. | |
| 5,611,050 A | 3/1997 | Theimer et al. | |
| 5,615,325 A | 3/1997 | Peden | |
| 5,617,526 A | 4/1997 | Oran et al. | 395/155 |
| 5,644,363 A | 7/1997 | Mead | |
| 5,717,877 A | 2/1998 | Orton et al. | |
| 5,736,974 A | 4/1998 | Selker | |
| 5,742,905 A | 4/1998 | Pepe et al. | |
| 5,751,965 A | 5/1998 | Mayo et al. | |
| 5,757,916 A | 5/1998 | MacDoran et al. | |
| 5,767,852 A | 6/1998 | Keller et al. | |
| 5,784,124 A | 7/1998 | D'Alitalia et al. | |
| 5,812,865 A | 9/1998 | Theimer et al. | |
| 5,831,545 A | 11/1998 | Murray et al. | |
| 5,852,440 A | 12/1998 | Grossman et al. | |
| 5,859,640 A | 1/1999 | de Judicibus | |
| 5,864,848 A | 1/1999 | Horvitz | |
| 5,928,330 A | 7/1999 | Goetz et al. | |
| 5,973,612 A | 10/1999 | Deo et al. | |
| 5,987,234 A | 11/1999 | Hirosawa et al. | |
| 6,021,403 A | 2/2000 | Horvitz | |
| 6,023,723 A | 2/2000 | McCormick et al. | 709/206 |
| 6,055,505 A | 4/2000 | Elston | |
| 6,057,842 A | 5/2000 | Knowlton et al. | |
| 6,067,477 A | 5/2000 | Wewalaarachchi et al. | |
| 6,067,565 A | 5/2000 | Horvitz | |
| 6,078,322 A | 6/2000 | Simonoff et al. | |
| 6,092,068 A | 7/2000 | Dinkelacker | |
| 6,094,681 A | 7/2000 | Shaffer et al. | |
| 6,101,531 A | 8/2000 | Eggleston et al. | |
| 6,119,014 A | 9/2000 | Alperovich et al. | |
| 6,144,363 A | 11/2000 | Alloul et al. | |
| 6,154,778 A * | 11/2000 | Koistinen et al. | 709/228 |
| 6,161,130 A | 12/2000 | Horvitz et al. | 709/206 |
| 6,167,448 A | 12/2000 | Hemphill et al. | |
| 6,256,664 B1 * | 7/2001 | Donoho et al. | 709/204 |
| 6,262,730 B1 | 7/2001 | Horvitz et al. | |
| 6,289,380 B1 | 9/2001 | Battat et al. | |
| 6,295,543 B1 | 9/2001 | Block et al. | 707/530 |
| 6,301,609 B1 | 10/2001 | Aravamudan et al. | |
| 6,327,581 B1 | 12/2001 | Platt | |
| 6,337,699 B1 | 1/2002 | Nielson | |
| 6,342,908 B1 | 1/2002 | Bates et al. | |
| 6,351,764 B1 | 2/2002 | Voticky et al. | 709/207 |
| 6,353,398 B1 | 3/2002 | Amin et al. | 340/995 |
| 6,360,101 B1 | 3/2002 | Irvin | |
| 6,370,526 B1 | 4/2002 | Agrawal et al. | 707/103 |
| 6,400,810 B1 | 6/2002 | Skladman et al. | |
| 6,425,127 B1 | 7/2002 | Bates et al. | |
| 6,437,812 B1 | 8/2002 | Giles et al. | |
| 6,438,618 B1 | 8/2002 | Lortz et al. | |
| 6,442,589 B1 | 8/2002 | Takahashi et al. | |
| 6,456,307 B1 | 9/2002 | Bates et al. | |
| 6,459,440 B1 | 10/2002 | Monnes et al. | |
| 6,459,913 B2 | 10/2002 | Cloutier | |
| 6,466,232 B1 | 10/2002 | Newell et al. | |
| 6,480,207 B1 | 11/2002 | Bates et al. | |
| 6,513,026 B1 | 1/2003 | Horvitz et al. | |
| 6,513,046 B1 | 1/2003 | Abbott, III et al. | |
| 6,519,639 B1 * | 2/2003 | Glasser et al. | 709/224 |
| 6,542,163 B2 | 4/2003 | Gorbet et al. | 345/711 |
| 6,549,219 B2 | 4/2003 | Selker | |
| 6,549,915 B2 | 4/2003 | Abbott, III et al. | |
| 6,549,937 B1 * | 4/2003 | Auerbach et al. | 709/206 |
| 6,563,514 B1 | 5/2003 | Samar | |
| 6,577,329 B1 | 6/2003 | Flickner et al. | |
| 6,584,502 B1 | 6/2003 | Natarajan et al. | |
| 6,590,587 B1 | 7/2003 | Wichelman et al. | |
| 6,591,279 B1 | 7/2003 | Emens et al. | |
| 6,593,943 B1 | 7/2003 | MacPhail | |
| 6,601,012 B1 | 7/2003 | Horvitz et al. | 702/150 |
| 6,618,716 B1 | 9/2003 | Horvitz | |
| 6,622,160 B1 | 9/2003 | Horvitz | |
| 6,650,902 B1 | 11/2003 | Richton | |
| 6,672,506 B2 | 1/2004 | Swartz et al. | 235/383 |
| 6,714,967 B1 | 3/2004 | Horvitz | |
| 6,741,188 B1 | 5/2004 | Miller et al. | 340/995.1 |
| 6,747,675 B1 | 6/2004 | Abbott et al. | |
| 6,757,830 B1 | 6/2004 | Tarbottom et al. | 713/188 |
| D494,584 S | 8/2004 | Schlieffers et al. | D14/346 |
| 6,791,580 B1 | 9/2004 | Abbott et al. | |
| 6,796,505 B2 | 9/2004 | Pellaumail et al. | 235/462.13 |
| 6,801,223 B1 | 10/2004 | Abbott et al. | |
| 6,812,937 B1 | 11/2004 | Abbott et al. | |
| 6,829,639 B1 | 12/2004 | Lawson et al. | |
| 6,837,436 B2 | 1/2005 | Swartz et al. | 235/472.02 |
| 6,842,877 B2 | 1/2005 | Robarts et al. | |
| 6,965,917 B1 | 11/2005 | Aloni et al. | |
| 7,010,501 B1 | 3/2006 | Roslak et al. | 705/26 |
| 7,016,944 B1 | 3/2006 | Meyer et al. | |
| 7,040,541 B2 | 5/2006 | Swartz et al. | 235/472.02 |
| 7,063,263 B2 | 6/2006 | Swartz et al. | 235/472.02 |
| 7,069,309 B1 | 6/2006 | Dodrill et al. | |
| 7,073,129 B1 | 7/2006 | Robarts et al. | |
| 7,171,378 B2 | 1/2007 | Petrovich et al. | 705/26 |
| 7,195,157 B2 | 3/2007 | Swartz et al. | 235/383 |
| 7,209,955 B1 | 4/2007 | Major et al. | |
| 7,243,130 B2 | 7/2007 | Horvitz et al. | 709/207 |
| 7,249,159 B1 | 7/2007 | Horvitz et al. | 709/206 |
| 7,259,694 B2 | 8/2007 | Myllymaki et al. | 340/993 |
| 7,310,339 B1 * | 12/2007 | Powers et al. | 370/394 |
| 7,385,501 B2 | 6/2008 | Miller et al. | 340/539.13 |
| 7,634,528 B2 | 12/2009 | Horvitz et al. | |
| 7,743,340 B2 | 6/2010 | Horvitz et al. | |
| 7,844,666 B2 | 11/2010 | Horvitz et al. | |
| 2001/0007992 A1 | 7/2001 | Nakaoka | |
| 2001/0030664 A1 | 10/2001 | Shulman et al. | 345/714 |
| 2001/0030667 A1 | 10/2001 | Kelts | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2001/0049275 A1 | 12/2001 | Pierry et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0085701 A1 | 7/2002 | Parsons et al. | |
| 2002/0087525 A1 | 7/2002 | Abbott et al. | |
| 2002/0087649 A1 | 7/2002 | Horvitz | |
| 2002/0099817 A1 | 7/2002 | Abbott et al. | |
| 2002/0126140 A1 | 9/2002 | Gorbet et al. | |
| 2002/0174185 A1 | 11/2002 | Rawat et al. | 709/206 |
| 2002/0174199 A1 | 11/2002 | Horvitz | |
| 2003/0023690 A1 | 1/2003 | Lohtia et al. | 709/206 |
| 2003/0023691 A1 | 1/2003 | Knauerhase et al. | 709/203 |
| 2003/0028603 A1 | 2/2003 | Aktas et al. | |
| 2003/0046351 A1 | 3/2003 | Maruyama et al. | |
| 2003/0046401 A1 | 3/2003 | Abbott et al. | |
| 2003/0154476 A1 | 8/2003 | Abbott, III et al. | |
| 2003/0182394 A1 | 9/2003 | Ryngler et al. | |
| 2004/0030753 A1 | 2/2004 | Horvitz | |
| 2004/0061716 A1 | 4/2004 | Cheung et al. | |
| 2004/0201500 A1 | 10/2004 | Miller et al. | 340/539.17 |
| 2004/0225718 A1 | 11/2004 | Heinzel et al. | |
| 2005/0034078 A1 | 2/2005 | Abbott et al. | |
| 2005/0050143 A1 | 3/2005 | Gusler et al. | |
| 2005/0248437 A1 | 11/2005 | Hellebust et al. | |
| 2005/0266858 A1 | 12/2005 | Miller et al. | 340/539.17 |
| 2005/0272442 A1 | 12/2005 | Miller et al. | 340/995.1 |
| 2006/0019676 A1 | 1/2006 | Miller et al. | 455/456.1 |
| 2008/0090591 A1 | 4/2008 | Miller et al. | 340/539.17 |
| 2008/0091537 A1 | 4/2008 | Miller et al. | 705/14 |
| 2008/0161018 A1 | 7/2008 | Miller et al. | 455/456.3 |
| 2009/0299934 A1 | 12/2009 | Horvitz et al. | |

FOREIGN PATENT DOCUMENTS

| | | |
|---|---|---|
| EP | 0420779 | 4/1991 |
| EP | 0420779 A3 | 4/1991 |

| | | |
|---|---|---|
| EP | 0867823 | 9/1998 |
| EP | 0867823 A2 | 9/1998 |
| EP | 095633 | 3/1999 |
| EP | 0905633 A2 | 3/1999 |
| EP | 0905633 A3 | 7/2000 |
| GB | 2328110 A | 2/1999 |
| JP | 04-043751 | 2/1992 |
| JP | 04-082347 | 3/1992 |
| JP | 05-137057 | 6/1993 |
| JP | 06-046161 | 2/1994 |
| JP | 06-168086 | 6/1994 |
| JP | 06-168281 | 6/1994 |
| JP | 06-230918 | 8/1994 |
| JP | 07-143164 | 6/1995 |
| JP | 08-298544 | 11/1996 |
| JP | 08314827 | 11/1996 |
| JP | 08314827 A | 11/1996 |
| JP | 09-101990 | 4/1997 |
| JP | 09-212505 | 8/1997 |
| JP | 09269940 A | 10/1997 |
| JP | 10-013461 | 1/1998 |
| JP | 10-003375 | 6/1998 |
| JP | 1079756 | 8/1998 |
| JP | 10079756 A | 8/1998 |
| JP | 11-146010 | 5/1999 |
| JP | 11-249979 | 9/1999 |
| JP | 11-316762 | 11/1999 |
| JP | 11316726 | 11/1999 |
| JP | 2000-040000 | 2/2000 |
| JP | 2000-112846 | 4/2000 |
| JP | 2001-092755 | 4/2001 |
| JP | 2001-117894 | 4/2001 |
| JP | 2001-119749 | 4/2001 |
| JP | 2001-147872 | 5/2001 |
| JP | 2001-189749 | 7/2001 |
| JP | 2001-237874 | 8/2001 |
| JP | 2001-331422 | 11/2001 |
| JP | 2002-014923 | 1/2002 |
| JP | 2002-041431 | 2/2002 |
| JP | 2002-041433 | 2/2002 |
| JP | 2002-183021 | 6/2002 |
| JP | 2002-236654 | 8/2002 |
| JP | 2002-236655 | 8/2002 |
| JP | 2003-504751 | 2/2003 |
| JP | 2003-101588 | 4/2003 |
| JP | 2003-125366 | 4/2003 |
| JP | 2003-141050 | 5/2003 |
| JP | 2003-271531 | 9/2003 |
| JP | 2003-527656 | 9/2003 |
| JP | 2004-062451 | 2/2004 |
| JP | 2004-506961 | 3/2004 |
| JP | 2004-140432 | 5/2004 |
| KR | 101199978840 | 5/1999 |
| KR | 10-2000-0014713 | 3/2000 |
| KR | 1020030003407 A | 1/2003 |
| WO | 9635994 | 11/1996 |
| WO | WO96/35994 | 11/1996 |
| WO | WO97/38382 | 10/1997 |
| WO | 9800787 | 1/1998 |
| WO | WO 98/00787 | 1/1998 |
| WO | 9837680 | 8/1998 |
| WO | WO98/37680 | 8/1998 |
| WO | 9847268 | 10/1998 |
| WO | WO98/47268 | 10/1998 |
| WO | 9858321 | 12/1998 |
| WO | WO98/58321 | 12/1998 |
| WO | 9906915 | 2/1999 |
| WO | WO99/06915 | 2/1999 |
| WO | WO 99/34628 | 7/1999 |
| WO | WO99/41720 | 8/1999 |
| WO | WO99/67731 | 12/1999 |
| WO | WO 00/36493 | 6/2000 |
| WO | 00/49776 | 8/2000 |
| WO | 01/04723 | 1/2001 |
| WO | 01/09755 | 2/2001 |
| WO | 01/13576 | 2/2001 |
| WO | 01/69432 | 9/2001 |
| WO | WO 01/69387 A2 | 9/2001 |
| WO | 01/84764 | 11/2001 |
| WO | WO 02-39761 | 5/2002 |
| WO | WO 02/065250 A2 | 8/2002 |
| WO | 03/048914 | 6/2003 |
| WO | 03/048960 | 6/2003 |
| WO | WO 2004/025912 A2 | 3/2004 |
| WO | 2005/006130 | 1/2005 |

OTHER PUBLICATIONS

International Search Report dated Sep. 29, 2003 for PCT Application Serial No. 00/20685, 3 Pages.
Nitin Sawhney, et al., Nomadic Radio: Speech and Audio Interaction for Contextual Messaging in Nomadic Environments, ACM Transactions on Computer-Human Interaction, ACM, Sep. 1, 2000, pp. 353-383.
Costas Tsatsoulis, et al., Integrating Case-Based Reasoning and Decision Theory, 1997, 10 pages.
Francis Chu, et al., A Decision-Theoretic Approach to Reliable Message Delivery,1998, 15 pages.
Peter Haddawy, An Overview of Some Recent Developments in Bayesian Problem-Solving Techniques Introduction to This Special Issue, 1999, 9 pages.
Finn V. Jensen, Bayesian Networks Basics, Winter 1995/Spring 1996, 14 pages.
Yu Lo Cyrus Chang, et al., Bayesian Analysis for Fault Location in Homogeneous Distributed Systems, 1993, 10 pages.
Sanguk Noh, et al., Rational Communicative Behavior in Anti-Air Defense, 1998, 8 pages.
Alec Cameron, et al., Identifying and Localizing Electrical Components: A Case Study of Adaptive Goal-directed Sensing, 1997, 6 pages.
Doree Duncan Sehgmann, et al., The Message is the Medium, 1997, 12 pages.
Juha Takkinen, et al., CAFE: A Conceptual Model for Managing Information in Electronic Mail, 1998, 10 pages.
Jacob Palme, et al., Issues When Designing Filters in Messaging Systems, 1996, 7 pages.
Chaomei Chen, Visualizing Semantic Spaces and Author Co-citation Networks in Digital Libraries, 1999, 20 pages.
International Search Report dated Aug. 20, 2002, for International Application Serial No. PCT/US01/08711.
International Search Report dated Sep. 2, 2002, for International Application Serial No. PCT/US01/08710.
Robert M. Losee Jr., Minimizing Information Overload: The Ranking of Electronic Messages, 1989, 11 pages.
Paul E. Baclace, Competitive Agents for Information Filtering, Dec. 1999, 1 page.
Makoto Iwayama, et al., Hierarchical Bayesian Clustering for Automatic Text Classification, 1995, 6 pages.
William W. Cohen, Learning Rules that Classify E-Mail, 1996, 11 pages.
Gary Boone, Concept Features in Re: Agent, an Intelligent Email Agent, 1998, 8 pages.
Marti A. Hearst, et al., Machine Learning in Information Access Papers from the 1996 AAAI Spring Symposium, 1996, 3 pages.
Jonathan Isaac Helfman, et al., Ishmail: Immediate Identification of Important Information, 1995, 8 pages.
Eric Horvitz, et al., Models of Attention in Computing and Communication: From Principles to Applications, Communications of the ACM 46(3): 52-29, Mar. 2003.
M. Marx, et al., Clues: Dynamic Personalized Message Filtering, Proceedings of the ACM 1996 Conference on Computer Supported Cooperative Work, Boston, Nov. 16-20, 1996, pp. 113-121.
International Search Report dated Jun. 28, 2006 for International Patent Application Serial No. PCT/US04/19915, 4 pages.
M. Sahami, et al. A Bayesian approach to filtering junk email, in Workshop on learning for text categorizations, 1998, 8 pages, AAI Technical Report WS-98-05, AAAI.
D. Koller, et al. Toward optimal feature selection, in proceedings of 13th conference on machine learning, 1998, pp. 284-292, Morgan Kaufmann, San Francisco.

E. Horvitz, et al. The Lumiere project: Bayesian user modeling for inferring the goals and needs of software users, in proceedings of the 14th conf on uncertainty in AI, 1998, pp. 256-265, Morgan Kaufmann, San Francisco.

J. Platt, Probabilistic outputs for support vector machines and comparisons to regularized likelihood methods, In Advances in Large Margin Classifiers, 1999, 11 pages, MIT Press, Cambridge, MA.

H. Leiberman, Letizia: An Agent that assists web browsing, in proceedings of IJCAI-95, 1995, 6 pages, Montreal Canada, Morgan Kaufmann, San Francisco.

Horvitz, et al. Display of Information for time-critical decision making, in Proceedings of the 11th Conf on uncertainty in Al, 1995, pp. 296-305, Monetrea, Canada.

M. Czerwinski, et al. Visualizing implicit queries for information management and retrieval, in proceedings of CHI'99, ACM SIGCHI Conf on informational and knowledge management, 1999, pp. 560-567, ACM.

S. Dumais, et al. Inductive learning algorithms and representations for text categorization, in proceedings of 7th Intl Conf on Information and Knowledge Management, 1998, pp. 148-155, ACM.

Platt, Fast training of support vector machines using sequential minimal optimization, in advances in kernel methods, support vector learning, 1999, pp. 41-65 MIT Press, Cambridge, MA.

Horvitz, Principles of mixed-initiative user interfaces, in proceedings of CHI'99, ACM SIGCHI Conf on Human Factors in Computing Systems, 1999, pp. 159-166, Pittsburgh, PA, ACM.

Breese, et al. Empirical analysis of predictive algorithms for collaborative filtering, in proceedings of the 14th conf on uncertainty in AI, 1998, pp. 43-52, AUAI, Morgan Kaufmann, San Francisco.

Horvitz, Time dependent utility and action under uncertainty, in proceedings of 7th conf on uncertainty in AI, LA, CA, 1991, pp. 151-158, Morgan Kaufmann, San Francisco.

Horvitz, Time-critical action: representations and application, in proceedings of the 13th conf on uncertainty in AI (UAI-97), 1997, pp. 250-257, Providence, RI, Morgan Kaufmann, San Francisco.

Sofus A. Macskassy, et al., EmailValet: Learning Email Preferences for Wirless Platforms, Rutgers University, User Modeling 1999 Workshop—Machine Learning for User Modeling, Jun. 3, 1999, 4 Pages.

M. Van Dantzich, D. Robbins, E. Horvitz, and M. Czerwinski. Scope: Providing Awareness of Multiple Notifications at a Glance. In Proceedings of AVI 2002, ACM Conference on Advanced Visual Interfaces, 2002. 11 pages.

European Search Report dated Sep. 28, 2004 for Application No. EP 05 10 5299, 4 pages.

Roel Vertegaal. Designing Attentive Interfaces. Proceedings of the Symposium on ETRA 2002: Eye tracking research and applications symposium, pp. 23-30, 2002.

Jeffrey S. Shell, Ted Selker, and Roel Vertegaal. Interacting with Groups of Computers. Communications of the ACM, vol. 46 Issue 3, pp. 40-46, 2003.

D. Scott Mccrickard and C.M. Chewar. Attuning Notification Design to User Goals and Attention Costs. Communications of the ACM, vol. 46 Issue 3, pp. 67-72, 2003.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993. 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Contest-Aware Computing Applications, In Proceedings of the Workshop on Mobile Computing Systems and Applications, Dec. 1994, pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 92-102. vol. 10-No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system. The Proceedings of The First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Diseeminationg Active Map Information to Mobile Hosts, IEEE Network, 1994, pp. 22-32, vol. 8-No. 5.

Mark Billinghurst. et al., Wearable Devices: New Ways to Manage Information. IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Contesting Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

European Search Report dated Sep. 28, 2004 for Application No. EP 05 10 5299, 4 pages.

U.S. Appl. No. 60/189,801, filed Mar. 2000, Horvitz et al.

Japanese Office Action mailed Feb. 12, 2010, in Japanese Patent Application No. 2006-517518 (4 pages).

Japanese Notice of Allowance mailed Feb. 26, 2010, in Japanese Patent Application No. 2004-020451 (6 pages).

Japanese Office Action mailed Aug. 7, 2009, in Japanese Patent Application No. 2004-020451 (4 pages).

Japanese Final Office Action mailed Oct. 21, 2008, in Japanese Patent Application No. 2002-331278 (6 pages).

Japanese Office Action mailed Jun. 27, 2008, in Japanese Patent Application No. 2002-331278 (6 pages).

Japanese Office Action mailed Apr. 16, 2010, in Japanese Patent Application No. 2004-156807 (13 pages).

India First Examination Report mailed Apr. 4, 2008, in India Patent Application No. 5292/DELN/P2005 (2 pages).

India Examination Report mailed Mar. 24, 2009, in India Patent Application No. 5292DELNP2005 (1 page).

Australian Office Action dated May 3, 2010, in Australian Patent Application No. 2005202775 (53 pages).

Chinese Third Office Action mailed Aug. 28, 2009, in People's Republic of China Patent Application No. 200410079768.9 (8 pages).

Chinese Second Office Action mailed Mar. 20 2009, in People's Republic of China Patent Application No. 200410079768.9 (10 pages).

Chinese Office Action mailed Jul. 6, 2007, in People's Republic of China Patent Application No. 200410079768.9 (11 pages).

Chinese Third Office Action mailed Oct. 16, 2009, in People's Republic of China Patent Application No. 200410079763.6 (13 pages).
Chinese Fourth Office Action mailed Feb. 5, 2010, in People's Republic of China Patent Application No. 200410079763.6 (15 pages).
Chinese Office Action mailed Oct. 16, 2006, in People's Republic of China Patent Application No. 200410079763.6 (15 pages).
Chinese Second Office Action mailed Mar. 13, 2009, in People's Republic of China Patent Application No. 200410079763.6 (9 pages).
Chinese Office Action mailed Jul. 6, 2007, in People's Republic of China Patent Application No. 200410079763.6 (6 pages).
Chinese First Office Action mailed Apr. 14, 2010, in People's Republic of China Patent Application No. 200410063950.5 (14 pages).
Chinese First Office Action mailed Jun. 15, 2007, in People's Republic of China Patent Application No. 200410043017.1 (16 pages).
Chinese Third Office Action mailed Jan. 23, 2009, in People's Republic of China Patent Application No. 01809514.3 (7 pages).
Chinese Second Office Action mailed May 9, 2008, in People's Republic of China Patent Application No. 0108514.3 (13 pages).
Chinese First Office Action mailed Dec. 10, 2004, in People's Republic of China Patent Application No. 01809514.3 (11 pages).
Chinese First Office Action mailed Jun. 29, 2007, in People's Republic of China Patent Application No. 200410079772.5 (10 pages).
Chinese Second Office Action mailed Mar. 13, 2009, in People's Republic of China Patent Application No. 200410079772.5 (12 pages).
Chinese Third Office Action mailed Feb. 5, 2010, in People's Republic of China Patent Application No. 200410079772.5 (13 pages).
Chinese Second Office Action mailed Jun. 5, 2009, in People's Republic of China Patent Application No. 200480015643.8 (14 pages).
Chinese Third Office Action mailed Dec. 25, 2009, in People's Republic of China Patent Application No. 200480015643.8 (18 pages).
Chinese First Office Action mailed Jul. 4, 2008, in People's Republic of China Patent Application No. 200480015643.8 (23 pages).
Chinese First Office Action mailed Aug. 15, 2008, in People's Republic of China Patent Application No. 200510081863.7 (11 pages).
Chinese Office Action mailed Mar. 6, 2009, in People's Republic of China Patent Application No. 200510081863.7 (4 pages).
Korean Office Action mailed Oct. 1, 2009, in Korean Patent Application No. 10-2009-7015992 (2 pages) [*English translation only*].
Korean Final Office Action mailed Sep. 15, 2009, in Korean Patent Application No. 10-2008-7012535 (6 pages).
Korean Office Action mailed Apr. 7, 2009, in Korean Patent Application No. 10-2008-7012535 (6 pages).
Korean Office Action mailed Sep. 24, 2008, in Korean Patent Application No. 10-2008-7012535 (7 pages).
Korean Office Action mailed Aug. 3, 2007, in Korean Patent Application No. 10-2002-7010701 (9 pages).
Korean Final Office Action mailed Mar. 25, 2008, in Korean Patent Application No. 10-2002-7010701 (4 pages).
Korean Office Action mailed May 29, 2008, in Korean Patent Application No. 10-2002-7010701 (3 pages).
Korean Office Action mailed Mar. 30, 2009, in Korean Patent Application No. 10-2002-7010700 (4 pages).
Korean Office Action mailed Jul. 18, 2007, in Korean Patent Application No. 10-2002-7010700 (6 pages).
Korean Office Action dated Feb. 27, 2008, in Korean Patent Application No. 10-2002-7010700 (11 pages).
Korean Final Office Action mailed Nov. 13, 2009, in Korean Patent Application No. 10-2002-70695 (7 pages).
Korean Office Action mailed May 28, 2009, in Korean Patent Application No. 10-2002-70695 (15 pages).
Non-Final Office Action mailed Mar. 18, 2005, in U.S. Appl. No. 10/220,550 (22 pages).
Response to Non-Final Office Action (Mar. 18, 2005), filed Jun. 13, 2005, in U.S. Appl. No. 10/220,550 (19 pages).
Final Office Action mailed Sep. 22, 2005, in U.S. Appl. No. 10/220,550 (23 pages).
Response Final Office Action (Sep. 22, 2005), filed Oct. 28, 2005, in U.S. Appl. No. 10/220,550 (17 pages).
Advisory Action mailed Nov. 30, 2005, in U.S. Appl. No. 10/220,550 (4 pages).
RCE/Response to Final Action (Sep. 22, 2005), filed Dec. 22, 2005, in U.S. Appl. No. 10/220,550 (16 pages).
Non-Final Office Action mailed Mar. 30, 2006, in U.S. Appl. No. 10/220,550 (22 pages).
Response to Non-Final Office Action (Mar. 30, 2006), filed Jun. 28, 2006, in U.S. Appl. No. 10/220,550 (10 pages).
Final Office Action mailed Oct. 4, 2006, in U.S. Appl. No. 10/220,550 (27 pages).
Response to Final Office Action (Oct. 4, 2006), filed Dec. 1, 2006, in U.S. Appl. No. 10/220,550 (19 pages).
Advisory Action filed Jan. 23, 2007, in U.S. Appl. No. 10/220,550 (3 pages).
Appeal Brief filed Apr. 23, 2007, in U.S. Appl. No. 10/220,550 (23 pages).
Reply to Notice of Non-Compliant Appeal Brief filed Aug. 30, 2007, in U.S. Appl. No. 10/220,550 (22 pages).
Reply to Notice of Non-Compliant Appeal Brief (Nov. 23, 2007), filed Dec. 21, 2007, in U.S. Appl. No. 10/220,550 (22 pages).
Examiner's Answer to Appeal Brief mailed Mar. 18, 2008, in U.S. Appl. No. 10/220,550 (28 pages).
Examiner's Answer to Appeal Brief mailed Apr. 2, 2008, in U.S. Appl. No. 10/220,550 (28 pages).
Non-Final Office Action mailed Apr. 10, 2007, in U.S. Appl. No. 10/611,491 (18 pages).
Response to Non-Final Office Action (Apr. 10, 2007), filed Jul. 10, 2007, in U.S. Appl. No. 10/611,491 (13 pages).
Final Office Action mailed Oct. 4, 2007, in U.S. Appl. No. 10/611,491 (21 pages).
Response to Final Office Action (Oct. 4, 2007), filed Oct. 31, 2007, in U.S. Appl. No. 10/611,491 (11 pages).
Non-Final Office Action mailed Jan. 14, 2008, in U.S. Appl. No. 10/611,491 (19 pages).
Response to Non-Final Office Action (Jan. 14, 2008), filed Apr. 10, 2008, in U.S. Appl. No. 10/611,491 (15 pages).
Notice of Allowance mailed Jun. 27, 2008, in U.S. Appl. No. 10/611,491 (17 pages).
Communication from the Examination Division mailed Jan. 3, 2008, in European Patent Office Application No. 07 013 320.2 (5 pages).
Communication from the Examination Division mailed Sep. 11, 2008, in European Patent Office Application No. 07 013 320.2 (3 pages).
Reply to Communication from the Examination Division (Jan. 3, 2008), filed Apr. 24, 2008, in European Patent Office Application No. 07 013 320.2 (16 pages).
Reply to Communication from the Examination Division (Sep. 11, 2008), filed Jan. 21, 2009, in European Patent Office Application No. 07 013 320.2 (9 pages).
Communication from the Examination Division mailed Mar. 27, 2006, in European Patent Office Application No. 04 102 332.6 (4 pages).
Reply to Communication from the Examination Division (Mar. 27, 2006), filed Oct. 6, 2006, in European Patent Office Application No. 04 102 332.6 (18 pages).
Communication from the Examination Division mailed Nov. 15, 2006, in European Patent Office Application No. 04 102 332.6 (9 pages).
Reply to Communication from the Examination Division (Nov. 15, 2006), filed May 14, 2007, in European Patent Office Application No. 04 102 332.6 (17 pages).
Decision to Grant a European Patent mailed Oct. 16, 2008, in European Patent Office Application No. 04 102 332.6 (2 pages).
European Search Report dated Mar. 11, 2005, cited in European Application No. 04 102 332 (6 pages).
Communication from the Examination Division mailed Nov. 6, 2006, in European Patent Office Application No. 05 105 299.1 (6 pages).
Reply to Communication from the Examination Division (Nov. 6, 2006), filed Mar. 14, 2007, in European Patent Office Application No. 05 105 299.1 (13 pages).

Communication from the Examination Division mailed Nov. 12, 2009, in European Patent Office Application No. 05 105 299.1 (8 pages).
Reply to Communication from the Examination Division (Nov. 12, 2009), filed Mar. 4, 2010, in European Patent Office Application No. 05 105 299.1 (20 pages).
European Search Report dated Sep. 21, 2005, cited in European Application No. 05 105 299 (4 pages).
The Oral Proceedings mailed Apr. 2, 2009, in European Patent Office Application No. 04 000 621.5 (43 pages).
Written Submission in Preparation to/during Oral Proceedings, filed Jan. 26, 2009, in European Patent Office Application No. 04 000 621.5 (49 pages).
Summons to Attend Oral Proceedings mailed Nov. 27, 2008, in European Patent Office Application No. 04 000 621.5 (10 pages).
Reply to Communication from the Examination Division (Jul. 14, 2006), filed Nov. 20, 2006, in European Patent Office Application No. 04 000 621.5 (12 pages).
Communication from the Examination Division mailed Jul. 14, 2006, in European Patent Office Application No. 04 000 621.5 (10 pages).
Communication from the Examination Division mailed Sep. 13, 2007, in European Patent Office Application No. 04 755 824.2 (8 pages).
Reply to Communication from the Examination Division (Sep. 13, 2007), filed Jan. 22, 2008, in European Patent Office Application No. 04 755 824.2 (25 pages).
Non-Final Office Action mailed Dec. 2, 2004, in U.S. Appl. No. 09/881,502 (8 pages).
Response to Non-Final Office Action (Dec. 2, 2004), filed Mar. 2, 2005, in U.S. Appl. No. 09/881,502 (4 pages).
Final Office Action mailed Jun. 3, 2005, in U.S. Appl. No. 09/881,502 (8 pages).
Response to Final Office Action (Jun. 3, 2005), filed Aug. 2, 2005, in U.S. Appl. No. 09/881,502 (4 pages).
Appeal Brief filed Nov. 8, 2005, in U.S. Appl. No. 09/881,502 (9 pages).
Examiner's Answer to Appeal Brief (Nov. 8, 2005), mailed Jan. 27, 2006, in U.S. Appl. No. 09/881,502 (9 pages).
Reply to Examiner's Answer to Appeal Brief (Jan. 27, 2006), filed Mar. 27, 2006, in U.S. Appl. No. 09/881,502 (4 pages).
BPAI Decision—Examiner Affirmed mailed Mar. 7, 2007, in U.S. Appl. No. 09/881,502 (6 pages).
Submission Pursuant to 37 CFR § 1.114 filed Feb. 29, 2008, in U.S. Appl. No. 09/881,502 (7 pages).
Non-Final Office Action mailed Sep. 5, 2008, in U.S. Appl. No. 09/881,502 (9 pages).
Response to Non-Final Office Action (Sep. 5, 2008), filed Jan. 5, 2009, in U.S. Appl. No. 09/881,502 (11 pages).
Supplemental Response to Non-Final Office Action (Sep. 5, 2008), filed Feb. 6, 2009, in U.S. Appl. No. 09/881,502 (11 pages).
Final Office Action, mailed Apr. 30, 2009, in U.S. Appl. No. 09/881,502 (11 pages).
Response to Final Office Action (Apr. 30, 2009), filed Jul. 21, 2009, in U.S. Appl. No. 09/881,502 (10 pages).
Non-Final Office Action mailed Oct. 14, 2009, in U.S. Appl. No. 09/881,502 (10 pages).
Response to Non-Final Office Action (Oct. 14, 2009), filed Jan. 14, 2010, in U.S. Appl. No. 09/881,502 (14 pages).
Final Office Action mailed Apr. 13, 2010, in U.S. Appl. No. 09/881,502 (14 pages).
Non-Final Office Action mailed Jun. 27, 2003, in U.S. Appl. No. 09/596,365 (10 pages).
Response to Non-Final Office Action (Jun. 27, 2003), filed Nov. 4, 2003, in U.S. Appl. No. 09/596,365 (13 pages).
Final Office Action mailed Jan. 14, 2004, in U.S. Appl. No. 09/596,365 (12 pages).
Response to Final Office Action (Jan. 14, 2004), filed Apr. 14, 2004, in U.S. Appl. No. 09/596,365 (14 pages).
Non-Final Action mailed Sep. 26, 2005, in U.S. Appl. No. 09/596,365 (6 pages).
Response to Non-Final Office Action (Sep. 26, 2005), filed Dec. 5, 2005, in U.S. Appl. No. 09/596,365 (12 pages).
Notice of Allowance mailed Apr. 14, 2006, in U.S. Appl. No. 09/596,365 (4 pages).
Non-Final Office Action mailed Aug. 7, 2006, in U.S. Appl. No. 09/596,365 (7 pages).
Response to Non-Final Office Action (Aug. 7, 2006), filed Oct. 29, 2006, in U.S. Appl. No. 09/596,365 (16 pages).
Notice of Allowance mailed Nov. 30, 2006, in U.S. Appl. No. 09/596,365 (7 pages).
Non-Final Office Action mailed Jan. 8, 2003, in U.S. Appl. No. 09/595,401 (9 pages).
Response to Non-Final Office Action (Jan. 8, 2003), filed Jun. 9, 2003, in U.S. Appl. No. 09/595,401 (15 pages).
Final Office Action mailed Jul. 25, 2003, in U.S. Appl. No. 09/595,401 (11 pages).
Response to Final Office Action (Jul. 25, 2003), filed Oct. 27, 2003, in U.S. Appl. No. 09/595,401 (16 pages).
Advisory Action mailed Nov. 3, 2003, in U.S. Appl. No. 09/595,401 (3 pages).
Response to Final Office Action (Jul. 25, 2003), filed Dec. 4, 2003, in U.S. Appl. No. 09/595,401 (19 pages).
Appeal Brief filed Feb. 6, 2004, in U.S. Appl. No. 09/595,401 (19 pages).
Examiner's Answer to Appeal brief (Feb. 6, 2004), mailed Mar. 11, 2004, in U.S. Appl. No. 09/595,401 (13 pages).
Appeal Brief filed Apr. 21, 2004, in U.S. Appl. No. 09/595,401 (5 pages).
BPAI Decision—Examiner Affirmed in Part mailed Aug. 10, 2005, in U.S. Appl. No. 09/595,401 (10 pages).
Submission Pursuant to 37 CFR § 1.114 mailed Sep. 23, 2005, in U.S. Appl. No. 09/595,401 (15 pages).
Non-Final Office Action mailed Dec. 28, 2005, in U.S. Appl. No. 09/595,401 (11 pages).
Response to Non-Final Office Action (Dec. 28, 2005), filed Mar. 27, 2006, in U.S. Appl. No. 09/595,401 (20 pages).
Final Office Action mailed Apr. 18, 2006, in U.S. Appl. No. 09/595,401 (16 pages).
Response to Final Office Action (Apr. 18, 2006), filed Jun. 7, 2006, in U.S. Appl. No. 09/595,401 (18 pages).
Advisory Action mailed Jun. 21, 2006, in U.S. Appl. No. 09/595,401 (3 pages).
Appeal Brief filed Sep. 18, 2006, in U.S. Appl. No. 09/595,401 (22 pages).
Examiner's Answer to Appeal Brief (Sep. 18, 2006), mailed Nov. 3, 2006, in U.S. Appl. No. 09/595,401 (16 pages).
Examiner's Answer to Appeal Brief (Sep. 18, 2006), mailed Dec. 13, 2006, in U.S. Appl. No. 09/595,401 (16 pages).
Response Brief to Examiner's Answer's to Appeal Briefs (Nov. 3, 2006 and Dec. 13, 2006), filed Jan. 3, 2007, in U.S. Appl. No. 09/595,401 (5 pages).
BPAI Decision—Examiner Affirmed mailed Feb. 14, 2008, in U.S. Appl. No. 09/595,401 (12 pages).
Submission Pursuant to 37 CFR § 1.114, filed Apr. 10, 2008, in U.S. Appl. No. 09/595,401 (16 pages).
Preliminary Amendment filed Jun. 10, 2008, in U.S. Appl. No. 09/595,401 (17 pages).
Non-Final Office Action mailed Jun. 11, 2008, in U.S. Appl. No. 09/595,401 (14 pages).
Notice of Allowance mailed Jun. 27, 2008, in U.S. Appl. No. 09/595,401 (6 pages).
Supplemental Notice of Allowability mailed Jun. 1, 2009, in U.S. Appl. No. 09/595,401 (2 pages).
Communication regarding the Transmission of the European Search Report mailed Mar. 31, 2005, in European Patent Application No. 02 025 530.3 (4 pages).
Communication regarding the Transmission of the European Search Report mailed Jun. 30, 2005, in European Patent Application No. 02 025 530.3 (9 pages).
Communication from the Examining Division mailed Apr. 19, 2006, in European Patent Application No. 02 025 530.3 (4 pages).
Reply to Communication from the Examining Division (Apr. 19, 2006), filed Aug. 11, 2006, in European Patent Application No. 02 025 530.3 (5 pages).

European Search Report dated Mar. 17, 2005, cited in European Application No. 02 025 530 (4 pages).
European Search Report dated Jun. 15, 2005, cited in European Application No. 02 025 530 (9 pages).
Communication from the Examining Division mailed Sep. 24, 2007, in European Patent Application No. 01 922 463.3 (4 pages).
Reply Communication from the Examining Division (Sep. 24, 2007), filed Jan. 28, 2008, in European Patent Application No. 01 922 463.3 (31 pages).
Communication from the Examining Division mailed Jun. 23, 2010, in European Patent Application No. 01 922 463.3 (4 pages).
Reply Communication from the Examining Division (May 30, 2003), filed Oct. 9, 2003, in European Patent Application No. 01 920 508.7 (6 pages).
Communication from the Examining Division mailed May 30, 2003, in European Patent Application No. 01 920 508.7 (4 pages).
Reply Communication from the Examining Division (Sep. 5, 2005), filed May 15, 2006, in European Patent Application No. 01 920 508.7 (14 pages).
Communication from the Examining Division mailed dated Sep. 5, 2005, in European Patent Application No. 01 920 508.7 (5 pages).
Non-Final Office Action mailed Jan. 2, 2004, in U.S. Appl. No. 09/882,857 (22 pages).
Response to Non-Final Office Action (Jan. 2, 2004), filed May 20, 2004, in U.S. Appl. No. 09/882,857 (13 pages).
Final Office Action mailed Oct. 21, 2004, in U.S. Appl. No. 09/882,857 (26 pages).
Response to Final Office Action (Oct. 21, 2004), filed Dec. 8, 2004, in U.S. Appl. No. 09/882,857 (16 pages).
Appeal Brief filed Mar. 8, 2005, in U.S. Appl. No. 09/882,857 (20 pages).
Non-Final Office Action mailed May 20, 2005, in U.S. Appl. No. 09/882,857 (31 pages).
Response to Non-Final Office Action (Mar. 20, 2005), mailed Aug. 17, 2005, in U.S. Appl. No. 09/882,857 (13 pages).
Final Office Action mailed Nov. 2, 2005, in U.S. Appl. No. 09/882,857 (15 pages).
Response to Final Office Action (Nov. 2, 2005), filed Dec. 12, 2005, in U.S. Appl. No. 09/882,857 (11 pages).
Non-Final Office Action mailed Apr. 4, 2006, in U.S. Appl. No. 09/882,857 (16 pages).
Response to Non-Final Office Action (Apr. 4, 2006), filed Jun. 30, 2006, in U.S. Appl. No. 09/882,857 (9 pages).
Final Office Action mailed Sep. 25, 2006, in U.S. Appl. No. 09/882,857 (9 pages).
Response to Final Office Action (Sep. 25, 2006), filed Nov. 22, 2006, in U.S. Appl. No. 09/882,857 (9 pages).
Supplemental Response to Final Office Action mailed Sep. 25, 2006, filed Dec. 26, 2006, in U.S. Appl. No. 09/882,857 (9 pages).
Final Office Action mailed Mar. 22, 2007, in U.S. Appl. No. 09/882,857 (9 pages).
Response to Non-Final Office Action (Mar. 22, 2007), filed Jun. 22, 2007, in U.S. Appl. No. 09/882,857 (9 pages).
Final Office Action mailed Aug. 31, 2007, in U.S. Appl. No. 09/882,857 (10 pages).
Response to Final Office Action (Aug. 13, 2007), filed Oct. 25, 2007, in U.S. Appl. No. 09/882,857 (11 pages).
Non-Final Office Action mailed Jan. 25, 2008, in U.S. Appl. No. 09/882,857 (10 pages).
Response to Non-Final Office Action (Jan. 25, 2008), filed Apr. 14, 2008, in U.S. Appl. No. 09/882,857 (11 pages).
Final Office Action mailed Jul. 22, 2008, in U.S. Appl. No. 09/882,857 (13 pages).
Response to Final Office Action (Jul. 22, 2008), filed Sep. 22, 2008, in U.S. Appl. No. 09/882,857 (7 pages).
Advisory Action mailed Oct. 14, 2008, in U.S. Appl. No. 09/882,857 (4 pages).
Appeal Brief filed Dec. 24, 2008, in U.S. Appl. No. 09/882,857 (17 pages).
Examiner's Answer to Appeal Brief (Dec. 24, 2008), mailed Apr. 16, 2009, in U.S. Appl. No. 09/882,857 (14 pages).
Reply Brief Filed Jun. 16, 2009, in U.S. Appl. No. 09/882,857 (7 pages).
Non-Final Office Action mailed Mar. 22, 2005, in U.S. Appl. No. 10/021,621 (40 pages).
Response to Non-Final Office Action mailed Mar. 22, 2005, filed Jul. 11, 2005, in U.S. Appl. No. 10/021,621 (25 pages).
Final Office Action mailed Sep. 20, 2005, in U.S. Appl. No. 10/021,621 (36 pages).
Response to Final Office Action (Sep. 20, 2005), filed Oct. 28, 2005, in U.S. Appl. No. 10/021,621 (22 pages).
Advisory Action mailed Nov. 30, 2005, in U.S. Appl. No. 10/021,621 (3 pages).
Appeal Brief filed Jan. 26, 2006, in U.S. Appl. No. 10/021,621 (25 pages).
Examiner's Answer to Appeal Brief (Jan. 26, 2006), filed Apr. 20, 2006, in U.S. Appl. No. 10/021,621 (39 pages).
Reply Brief to Examiner's Answer to Appeal Brief (Apr. 20, 2006), filed Jun. 20, 2006, in U.S. Appl. No. 10/021,621 (26 pages).
BPAI Decision—Examiner Affirmed mailed Mar. 14, 2007, in U.S. Appl. No. 10/021,621 (13 pages).
Submission Pursuant to 37 CFR § 1.114, filed May 14, 2007, in U.S. Appl. No. 10/021,621 (23 pages).
Non-Final Office Action mailed Aug. 24, 2007, in U.S. Appl. No. 10/021,621 (39 pages).
Response to Non-Final Office Action (Aug. 24, 2007), filed Nov. 21, 2007, in U.S. Appl. No. 10/021,621 (29 pages).
Final Office Action mailed Feb. 4, 2008, in U.S. Appl. No. 10/021,621 (39 pages).
Response to Final Office Action (Feb. 4, 2008), filed Apr. 4, 2008, in U.S. Appl. No. 10/021,621 (30 pages).
Advisory Action mailed Apr. 25, 2008, in U.S. Appl. No. 10/021,621 (4 pages).
Appeal Brief filed Aug. 21, 2008, in U.S. Appl. No. 10/021,621 (48 pages).
Appeal Brief filed dated Oct. 2, 2008, in U.S. Appl. No. 10/021,621 (3 pages).
Appeal Brief filed Jan. 22, 2009, in U.S. Appl. No. 10/021,621 (3 pages).
Appeal Brief filed Jun. 29, 2009, in United States Patent Application No. 10/021,621 (5 pages).
Appeal Brief filed Oct. 27, 2009, in U.S. Appl. No. 10/021,621 (49 pages).
Non-Final Office Action mailed Jan. 21, 2010, in U.S. Appl. No. 10/021,621 (41 pages).
Response to Non-Final Office Action (Jan. 21, 2010), filed Apr. 21, 2010, in U.S. Appl. No. 10/021,621 (18 pages).
Notice of Allowance mailed Jul. 23, 2010, in U.S. Appl. No. 10/021,621 (7 pages).
Notice of Allowance mailed Apr. 1, 2009, in U.S. Appl. No. 10/609,818 (6 pages).
Appeal Brief filed on Dec. 10, 2008, in U.S. Appl. No. 10/609,818 (44 pages).
Advisory Action mailed on Sep. 12, 2009, in U.S. Appl. No. 10/609,818 (4 pages).
Final Office Action mailed on Jul. 22, 2008, in U.S. Appl. No. 10/609,818 (14 pages).
Response to Final Office Action (Jul. 22, 2008), filed Aug. 27, 2008, in U.S. Appl. No. 10/609,818 (16 pages).
Non-Final Office Action mailed on Jan. 3, 2008, in U.S. Appl. No. 10/609,818 (15 pages).
Response to Non-Final Office Action (Jan. 3, 2008), filed Mar. 12, 2008, in U.S. Appl. No. 10/609,818 (16 pages).
Non-Final Office Action mailed Oct. 16, 2007, in U.S. Appl. No. 10/609,818 (13 pages).
Response to Non-Final Office Action (Oct. 16, 2007), in U.S. Appl. No. 10/609,818 (13 pages).
Advisory Action mailed on Aug. 29, 2007, in U.S. Appl. No. 10/609,818 (4 pages).
Final Office Action mailed on Jul. 24, 2007, in U.S. Appl. No. 10/609,818 (24 pages).
Response to Final Office Action (Jul. 24, 2007), filed on Aug. 21, 2007, in U.S. Appl. No. 10/609,818 (13 pages).
Non-Final Office Action mailed on Feb. 28, 2007, in U.S. Appl. No. 10/609,818 (18 pages).

Response to Non-Final Office Action (Feb. 28, 2007), filed on May 25, 2007, in U.S. Appl. No. 10/609,818 (12 pages).
Non-Final Office Action mailed on Apr. 1, 2010, in U.S. Appl. No. 11/469,058 (15 pages).
Non-Final Office Action mailed on Jun. 24, 2009, in U.S. Appl. No. 11/749,508 (12 pages).
Response to Non-Final Office Action (Jun. 24, 2009), filed on Sep. 24, 2009, in U.S. Appl. No. 11/749,508 (12 pages).
Final Office Action mailed on Jan. 14, 2010, in U.S. Appl. No. 11/749,508 (15 pages).
Response to Final Office Action (Jan. 14, 2010), filed on Apr. 14, 2010, in U.S. Appl. No. 11/749,508 (12 pages).
Non-Final Office Action mailed on May 13, 2010, in U.S. Appl. No. 11/749,508 (15 pages).
Supplemental Notice of Allowance mailed on Apr. 16, 2010, in U.S. Appl. No. 10/610,487 (2 pages).
Amendment After Notice of Allowance mailed Apr. 16, 2010, filed on Mar. 17, 2010, in U.S. Appl. No. 10/610,487 (11 pages).
Notice of Allowance mailed on Feb. 22, 2010, in U.S. Appl. No. 10/610,487 (4 pages).
Supplemental Response to Non-Final Office Action (Oct. 1, 2009), filed Jan. 15, 2010, in U.S. Appl. No. 10/610,487 (15 pages).
Response to Non-Final Office Action mailed Oct. 1, 2009, filed on Jan. 4, 2010, in U.S. Appl. No. 11/610,487 (15 pages).
Non-Final Office Action mailed Oct. 1, 2009, in U.S. Appl. No. 10/610,487 (9 pages).
Response to Final Office Action (Mar. 18, 2009), filed on Jul. 16, 2009, in U.S. Appl. No. 11/610,487 (16 pages).
Final Office Action mailed on Mar. 18, 2009, in U.S. Appl. No. 11/610,487 (27 pages).
Response to Non-Final Office Action (Sep. 5, 2008), filed on Dec. 5, 2008, in U.S. Appl. No. 11/610,487 (27 pages).
Non-Final Office Action mailed Sep. 5, 2008, in U.S. Appl. No. 10/610,487 (21 pages).
Response to Non-Final Office Action (Feb. 22, 2008), filed on May 22, 2008, in U.S. Appl. No. 11/610,487 (21 pages).
Non-Final Office Action mailed Feb. 22, 2008, in U.S. Appl. No. 10/610,487 (27 pages).
Notice of Allowance mailed on Aug. 21, 2008, in U.S. Appl. No. 11/737,247 (11 pages).
Response to Non-Final Office Action (Feb. 21, 2008), filed on May 21, 2008, in U.S. Appl. No. 11/737,247 (14 pages).
Non-Final Office Action mailed Feb. 21, 2008, in U.S. Appl. No. 10/737,247 (16 pages).
Notice of Allowance mailed Jan. 26, 2007, in U.S. Appl. No. 10/220,419 (12 pages).
Response to Non-Final Office Action (Oct. 4, 2006), filed Jan. 4, 2007, in U.S. Appl. No. 10/220,419 (20 pages).
Non-Final Office Action mailed Oct. 4, 2006, in U.S. Appl. No. 10/220,419 (16 pages).
Chien-Liang Liu, et al. The Design of Anti-SPAM Knowledge-Based system. Apricot 2003 Conference. Online, http://scholar.google.com/scholar?hl=en&lr=&q=spam+filter+%22White+list%22&btnG=Search, retrieved on Feb. 9, 2005. Feb. 2003 (23 pages).
Graham-Cumming et al. "Project of the Month, May 2003: POPFile" Sourceforge.net, May 2003: <http://sourceforge.net/potm-2003-05.php> (6 pages).
Identifying and Localizing Electrical Components: A Case Study of Adaptive Goal-directed Sensing, 1991 IEEE (6 pages).
Palme, Jacob, et al. Issues when designing filters in messaging systems, Computer Communications, Jan. 11, 1995 (7 pages).
Jeftovic, Mark. "SpamAssassin Prehistory: filter.plx," Feb. 1998. Version 1.02d. Description from the Apache Software Foundation (<http://spamassassin.apache.org/prehistory/>) accessed Feb. 15, 2007 (1 page).
International Search Report dated Aug. 20, 2002, cited in Application No. PCT/US 01/08711 (priority PCT application) (12 pages).
International Search Report dated Sep. 2, 2002, cited in Application No. PCT/US 01/08710 (priority PCT application) (7 pages).
International Search Report dated Jun. 28, 2006, cited in Application No. PCT/US04/19915 (2 pages).

InterOp Magazine, 1999, as cited in Japanese Application No. JP 2002-331278, rejection mailed Jun. 27, 2008, (*English translation not available*) (6 pages).
Notice of Allowance mailed Apr. 10, 2009, in U.S. Appl. No. 10/609,818 (6 pages).—Resubmission to correct date error.
Advisory Action mailed on Sep. 12, 2008, in U.S. Appl. No. 10/609,818 (4 pages). —Resubmission to correct date error.
Van Dantzich et al., "Scope: Providing Awareness of Multiple Notifications at a Glance," Proceedings of AVI 2002, ACM Conference on Advanced Visual Interfaces, 2002, 11 pages.
Final Office Action mailed Oct. 29, 2010, in U.S. Appl. No. 11/749,508 (10 pages).
China Notice on Grant of Patent Right for Invention, in Chinese Application No. 200410079772.5, mailed Oct. 13, 2010 (4 pages).
Japanese Notice of Allowance, in Japanese Patent Application No. 2004-156807, mailed Oct. 5, 2010, (6 pages).
Japanese Notice of Rejection, in Japanese Patent Application No. 2001-567443, mailed Sep. 7, 2010, (9 pages).
Susuki, et al., Technique of Using Mobile & Network (3). Interop Magazine. Sep. 1, 1999; 9(7): 170-73, Japanese.
Australian Notice of Allowance mailed May 26, 2010, in Australian Patent Application No. 2005202775 (3 pages).
Australian Office Action dated Dec. 21, 2009, in Australian Patent Application No. 2005202775 (53 pages).
China Notice on Grant of Patent Right for Invention, in Chinese Application No. 200410079772 5, mailed Oct. 13, 2010 (4 pages).
China Response to Second Office Action mailed Mar. 13, 2009, in Chinese Application No. 200410079772.5, filed Jul. 28, 2009 (12 pages).
China Decision on Rejection mailed Oct. 14, 2010, in Chinese Application No. 200410079763.6 (13 pages).
China Response to Second Office Action mailed Mar. 13, 2009, in Chinese Application No. 200410079763.6, filed Jul. 28, 2009 (13 pages).
China Response to Fourth Office Action mailed Feb. 5, 2010, in Chinese Application No. 200410079763.6, filed Apr. 19, 2010 (13 pages).
China Response to Third Office Action mailed Oct. 16, 2009, in Chinese Application No. 200410079763.6, filed Dec. 28, 2009 (10 pages).
Chinese Response to First Office Action mailed Jul. 4, 2008, in People's Republic of China Patent Application No. 200480015643.8, filed Nov. 4, 2008 (24 pages).
Chinese Response to Second Office Action mailed Jun. 5, 2009, in People's Republic of China Patent Application No. 200480015643.8, filed Aug. 5, 2009 (21 pages).
Chinese Response to Third Office Action mailed Dec. 25, 2009, in People's Republic of China Patent Application No. 200480015643.8, filed Feb. 25, 2010 (20 pages).
Chinese Response to First Office Action mailed Apr. 14, 2010, in People's Republic of China Patent Application No. 200410063950.5, filed May 28, 2010 (21 pages).
Chinese Notice on Grant of Patent Right for Invention mailed Aug. 1, 2008, in People's Republic of China Patent Application 200410043017.1 (4 pages).
Chinese Response to First Office Action mailed Dec. 10, 2004, in People's Republic of China Patent Application No. 01809514.3, Apr. 21, 2005 (9 pages).
Chinese Response to Second Office Action mailed May 9, 2008, in People's Republic of China Patent Application No. 0109514.3, Jul. 8, 2008 (10 pages).
Chinese Response to Third Office Action mailed Jan. 23, 2009, in People's Republic of China Patent Application No. 01809514.3, Mar. 19, 2008 (4 pages).
Chinese Notice on Grant of Patent Right for Invention mailed Oct. 30, 2009, in People's Republic of China Patent Application 01809514.3 (4 pages).
Chinese Response to Office Action mailed Jul. 6, 2007, in People's Republic of China Patent Application No. 200410079768.9, filed Nov. 19, 2007 (8 pages).
Chinese Response to Second Office Action mailed Mar. 20 2009, in People's Republic of China Patent Application No. 200410079768.9, Jul. 17, 2009 (24 pages).

Chinese Response to Third Office Action mailed Aug. 28, 2009, in People's Republic of China Patent Application No. 200410079768.9, Oct. 30, 2009 (18 pages).

Chinese Notice on Grant of Patent Right for Invention mailed Dec. 4, 2009, in People's Republic of China Patent Application 200410079768.9 (4 pages).

Chinese Response to First Office Action mailed Aug. 15, 2008, in People's Republic of China Patent Application No. 200510081863.7, filed Dec. 29, 2008 (21 pages).

Chinese Notice on Grant of Patent Right for Invention mailed Mar. 6, 2009, in People's Republic of China Patent Application 200510081863.7 (4 pages).

European Response to Communication from the Examining Division mailed Jun. 23, 2010, in European Patent Application No. 01 922 463.3, filed Nov. 3, 2010 (20 pages).

European Minutes and Decision of the Oral Proceedings mailed Dec. 7, 2009, in European Patent Application No. 04755824.2 (22 pages).

European Statement of Ground of Appeal filed Apr. 9, 2010, in European Patent Application No. 04755824.2 (34 pages).

European Reply to Communication from the Examination Division mailed Nov. 12, 2009, in European Patent Office Application No. 05 105 299.1, filed Mar. 4, 2010 (20 pages).

European Decision to Grant mailed dated Jun. 21, 2007, in European Patent Application No. 01 920 508.7 (2 pages).

European Decision to Grant mailed Oct. 16, 2008, in European Patent Office Application No. 04 102 332.6 (2 pages).

Japanese Notice of Rejection mailed on Sep. 7, 2010, in Japanese Patent Application No. 2001-567443 (9 pages).

Japanese Response to Notice of Rejection mailed on Sep. 7, 2010, in Japanese Patent Application No. 2001-567443, filed Dec. 7, 2010 (20 pages).

Japanese Final Rejection mailed on Dec. 28, 2010, in Japanese Patent Application No. 2001-567443 (4 pages).

Tategami, Tatsuhiko. "Reading Mail Received on Personal Computer in i-mode, Every Mail Transfer," *Associated Utilization Technique of i-mode + Personal Computer*, 1$^{st}$Ed., pp. 5-31, AI Publishing, Japan, Aug. 28, 2000.

Japanese Interrogation mailed on Dec. 17, 2010, in Japanese Patent Application No. 2002-331278 (8 pages).

Japanese Response to Final Office Action mailed Oct. 21, 2008, in Japanese Patent Application No. 2002- 331278, filed Feb. 18, 2009 (11 pages).

Japanese Response to Office Action mailed Jun. 27, 2008, in Japanese Patent Application No. 2002-331278, filed Sep. 29, 2008 (11 pages).

Japanese Notice of Rejection mailed Nov. 30, 2010, in Japanese Patent Application No. 2006-517518 (6 pages).

Japanese Response to Office Action mailed Nov. 30, 2010, in Japanese Patent Application No. 2006-517518, filed Feb. 28, 2011 (11 pages).

Japanese Response to Office Action mailed Apr. 16, 2010, in Japanese Patent Application No. 2004-156807, filed Jul. 16, 2010 (17 pages).

Japanese Notice of Allowance mailed Oct. 8, 2010, in Japanese Patent Application No. 2004-156807 (6 pages).

Japanese Notice of Rejection mailed on Jan. 18, 2011, in Japanese Patent Application No. 2005-188308 (8 pages).

Korean Appeal Brief filed Aug. 14, 2009, in Korean Patent Application No. 10-2008-7012535 (40 pages).

Korean Response to Office Action mailed Oct. 1, 2010, in Korean Patent Application No. Oct. 2009-7015992, filed Feb. 1, 2011 (33 pages).

Korean Appeal Brief filed in Response to Final Office Action mailed Nov. 13, 2009, in Korean Patent Application No. 10-2002-70695, filed Dec. 14, 2009 (7 pages).

Korean Response to Office Action mailed Mar. 9, 2010, in Korean Patent Application No. 10-2010-725, filed May 7, 2010 (12 pages).

Korean Response to Office Action mailed Jan. 10, 2011, in Korean Patent Application No. 10-2004-38693, filed Mar. 10, 2011 (20 pages).

Korean Response to Office Action mailed Sep. 30, 2010, in Korean Patent Application No. 10-2004-05500, filed Nov. 30, 2010 (36 pages).

RCE/Amendment filed in Response to Examiner Answer to Appeal Brief mailed Apr. 2, 2008, in U.S. Appl. No. 10/220,550, filed Mar. 18, 2011 (8 pages).

Decision on Appeal mailed Jan. 20, 2011, in U.S. Appl. No. 10/220,550 (17 pages).

Notice of Allowance mailed on Feb. 18, 2011, in U.S. Appl. No. 11/749,508 (9 pages).

Final Office Action mailed on Oct. 29, 2010, in U.S. Appl. No. 11/749,508 (10 pages).

Response to Final Office Action mailed on Oct. 29, 2010, in U.S. Appl. No. 11/749,508, filed Jan. 31, 2011 (14 pages).

Response to Non-Final Office Action mailed on May 13, 2010, in U.S. Appl. No. 11/749,508, filed Aug. 9, 2010 (13 pages).

Non-Final Office Action mailed on Jan. 7, 2011, in U.S. Appl. No. 12/476,195 (7 pages).

Chinese Reexamination Request filed Jan. 7, 2011, in Chinese Application No. 200410079763.6.

Chinese Decision on Rejection mailed Mar. 23, 2011, in Chinese Application no. 200480015643.8.

Chinese Reexamination Request filed Jan. 7, 2011, in Chinese Application No. 200480015643.8.

European Response to Communication from the Examining Division mailed Nov. 12, 2009, in European Patent Application no. 05 105 299.1, filed Mar. 4, 2010 (20 pages).

India First Examination Report mailed Mar. 22, 2011, in India Patent Application No. 32/MUM/2004 (2 pages).

Japanese. Response filed Apr. 18. 2011 in Japanese Application No. 2005-188308.

Korean Response filed Apr. 8, 2011 in Korean Application No. 10-2005-7021374.

Notice of Allowance mailed May 16, 2011, in U.S. Appl. No. 12/476,195.

Amendment in Response to Non-Final Office Action mailed Jan. 7, 2011, in U.S. Appl. No. 12/476,195, filed Apr. 7, 2011.

Supplemental Notice of Allowability mailed May 26, 2011, in U.S. Appl. No. 11/749,508.

Supplemental Notice of Allowability mailed Apr. 16, 2010, in U.S. Appl. No. 10/610,487.

Notice of Allowance mailed May 6, 2011, in U.S. Appl. No. 10/220,550.

Nitin Sawhney, et al., Speaking and Listening on the Run: Design for Wearable Audio Computing, 1998, 8 pages.

European Search Report mailed Jul. 5, 2004, in European Application No. EP 04000621.

Japanese Patent Office Notice of Rejection mailed on Aug. 12, 2011, in Japanese Patent Application No. 2002-331278 (13 pgs.).

Honma, Kenji et al., "Lecture about Wielding Mail in Mobile Phone or PHS," NIKKEI Personal Computer, No. 350, pp. 234-249, Nikkei BP, Nov. 29, 1999 (18 pgs.).

People's Republic of China Notice on Grant of Patent Right for Invention, mailed Aug. 25, 2011 in Chinese Patent Application No. 200410079763.6 (4 pgs.).

Japanese Patent Office Notice of Rejection mailed on Sep. 16, 2011, in Japanese Patent Application No. 2005-188308 (12 pgs.).

Korean Amendment filed Aug. 29, 2011, in Korean Patent Application No. 10-2005-0053862 (33 pgs.).

Non-Final Office Action mailed Oct. 11, 2011, in U.S. Appl. No. 12/259,157 (8 pgs).

\* cited by examiner

WHEN-FREE MESSAGING

REFERENCE TO RELATED APPLICATIONS

This application is a continuation in part of U.S. patent application Ser. No. 10/611,491 filed on Jun. 30, 2003, entitled BOUNDED-DEFERRAL POLICIES FOR GUIDING THE TIMING OF ALERTING, INTERACTION AND COMMUNICATIONS USING LOCAL SENSORY INFORMATION, which claims the benefit of U.S. Provisional Application Ser. No. 60/450,841 filed on Feb. 28, 2003, entitled SYSTEM AND METHOD THAT FACILITATES COMMUNICATIONS. This application is also a continuation in part of U.S. patent application Ser. No. 09/881,502 filed on Jun. 14, 2001, entitled BOUNDED-DEFERRAL POLICIES FOR REDUCING THE DISRUPTIVENESS OF NOTIFICATIONS, which claims the benefit of U.S. Provisional Patent Application Ser. No. 60/212,296, filed on Jun. 17, 2000, entitled HEURISTIC COMMUNICATIONS POLICIES FOR A NOTIFICATION PLATFORM. The entireties of these applications are incorporated herein by reference.

TECHNICAL FIELD

The present invention relates generally to systems and methods that facilitate communications between devices, systems, processes, and/or individuals. More particularly, the present invention relates to smart sensing of endpoint devices that are employed with various communications systems and in accordance with bounded deferral policies for minimizing the disruptiveness of notifications.

BACKGROUND OF THE INVENTION

Despite the impressive abilities of people to sense, remember, and reason about the world, cognitive abilities are extremely limited in well-characterized ways. In particular, psychologists have found that people wrestle with scarce attentional resources and limited working memory. Such limitations become salient when people are challenged with remembering more than a handful of new ideas or items in the short term, recognizing important targets against a background pattern of items, or interleaving multiple tasks.

These results indicate that people must typically inspect the world through a limited spotlight of attention. As such, most people often generate clues implicitly and explicitly about what they are selectively attending to and how deeply they are focusing. Findings about limited attentional resources have significant implications for how computational systems and interfaces are designed. With respect to attentional resources, electronic communications are usually transmitted in a one-directional manner, wherein the receiver or recipient of a message is notified upon message delivery irregardless of the recipient's ability to process the communications. Thus, with instant messaging as one example, receivers of an instant message are provided with a pop-up window indicating a sender's desire to communicate. This type of interruption however, does not consider the recipient's availability to receive such messages or engage in current conversation.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that mitigate the intrusiveness of communications between message senders and receivers while facilitating more courteous, seamless and timely interactions. In one aspect, instant messaging and other forms of communications can be improved via employment of time-bounded policies and parameters. For example, one problem with the use of instant messaging is the potential disruption that such messaging has on recipients who may not be ready to accept an instant message. When-Free messaging allows users to send When-Free messages, that act as near-instant messages that wait until a user or recipient is not in one of a list of states defined as busy states. A sender can encode, with a quick gesture or via a standing profile, how long a message is to remain alive before being erased or retracted, such that a sender can send a message, e.g., When Free: Hello, do you want to grab lunch (Time to live (TTL): 10 minutes). Thus, the message will only get through if the recipient becomes free within the TTL horizon.

A message received confirmation can be optionally sent when the message is rendered, or, in cases where the message has not made it through to the recipient by the time the lifespan of the message is up, a note that the message timed-out and was erased may be sent to the sender. Recipients can specify that messages that are near timing out can break through to them rather than timing out, if desired, as well as enable pending availability status to be transmitted as feedback to the message sender. The When-Free process to instant messaging and other communications forms facilitates lowering the bar on sending instant messages to others, especially people whom senders may not know well, as it provides a way to be courteous about messaging. When-Free approaches can also be applied to other communication media such as email and voicemail, for example.

The present invention relates to a system and method to facilitate communications of important messages or communications. Policies are described that consider a user's current situation, including the consideration of an inferred cost of interruption, or directly sensed surrogates for such a cost, in decisions about the best time, within a deadline for delivering messages. Deadlines for delivery depend on the urgency of the information that is inferred or detected from the message sender, type, and content. If a suitable time is not detected within a deadline, the information is delivered at the deadline. If it is determined that a suitable time will not achieved within a deadline, the information is transmitted immediately. Suitable times for delivery can be determined via the use of one or more sensors on or near endpoint devices, including accelerometers, microphones, touch sensing, and gaze and head pose detection. Other information, including appointment status as indicated on a user's calendar, time of day, and previously assessed patterns of availability can be employed in decisions about the deferral of alerts. Endpoint sensors, calendar information, and patterns of availability are also used to identify the likelihood that information will be received at a device. Such information can be passed back directly or in summary to a central notification manager or used locally in decisions about the salience and repetition of alerting.

One particular aspect of the present invention relates to systems and methods that facilitate efficient and timely communications between parties by mitigating disruptiveness associated with notifications. One particular aspect of the invention relates to employment of small devices (e.g., telephones, PDAs, smart pens, watches, eyewear) in connection with message notification and/or best mode to effect communications. In accordance with the subject invention, small devices can be made aware or at least partly aware of various metrics relating to attentional status and/or location of users. Information determined and/or inferred by the small device(s) in connection with the attentional status and/or location can be shared between small devices as well as with disparate devices or systems (e.g., a central Notification Managing system). The information can be disseminated individually, in serial or parallel vis a vis other devices, as well as aggregated. The information can be employed to facilitate providing a notification service and/or determining or inferring a best mode in which to effect communications with and between users.

One example aspect provides for employment of bounded-deferral policies wherein a local device commits to relaying a message that it has received before a message-specific deadline is reached; the device in accordance with the invention attempts to determine or infer a most appropriate time for interruption within an allotted period. Such determination or inference can employ statistical-based and/or probabilistic-based and/or utility-based (e.g., benefit of interruption given cost of interruption) techniques. Devices in accordance with the subject invention can employ various sensing modalities (e.g., MEMS-based sensors, temperature sensors, accelerometers, gyroscopes, light-based sensors, time-based sensors, GPS, 802.11 signal strength, infrared proximity detectors, touch sensors, . . . ) in connection with learning or inferring an attentional status and/or location of users. With respect to sharing and/or sending sensed states, it is to be appreciated that all sensed states, subsets or summaries thereof can be communicated.

Another aspect of the invention provides for taking into consideration states of the device(s) and surrounding environment as well. For example, transmission reliability (transrel) of the device can be considered (e.g., on a sliding scale representing the P(transrel|context), that is the likelihood of getting through on a device given context (is a function such as for example f(context) or f(sensed states).

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
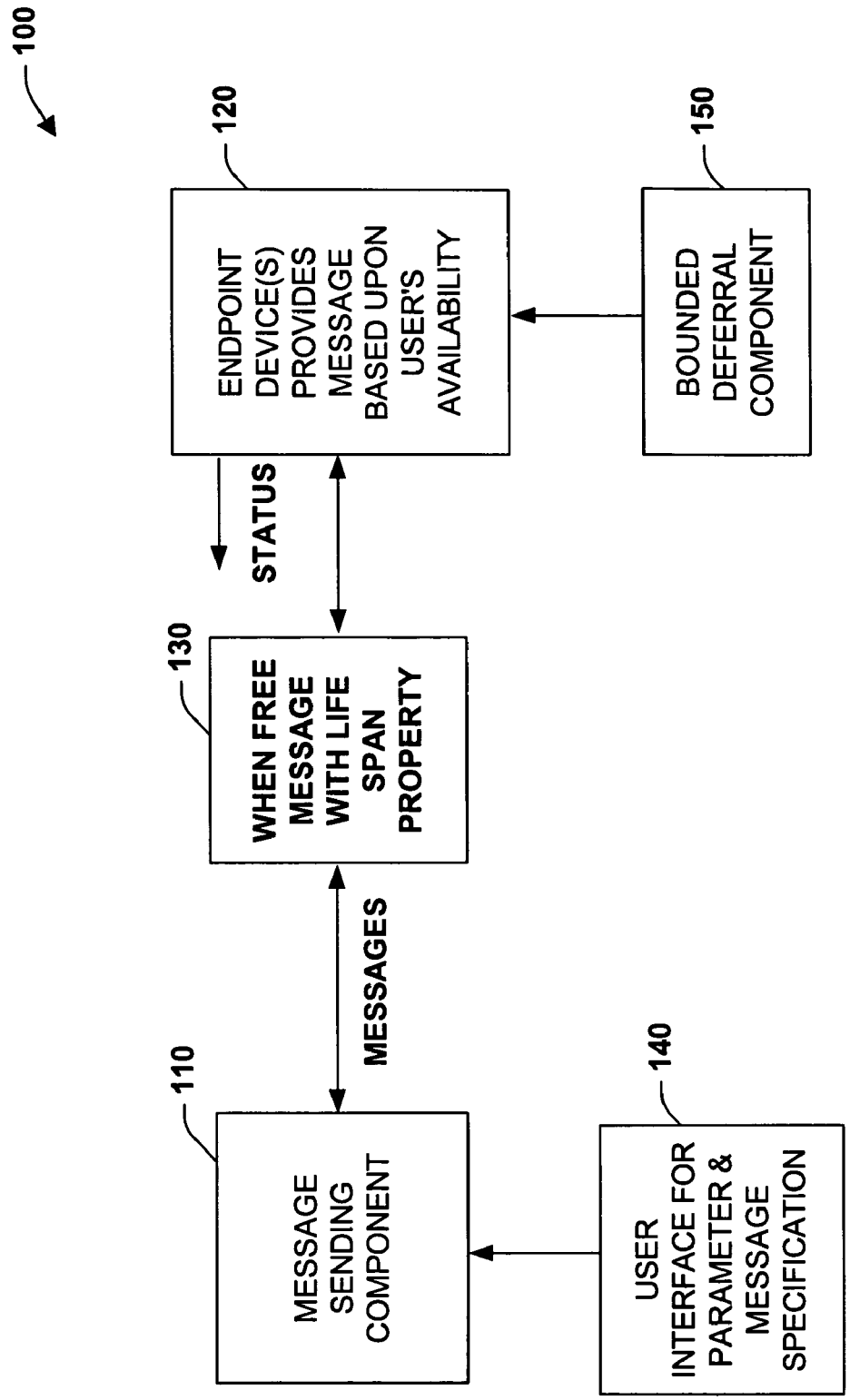
FIG. 1 is a schematic block diagram illustrating a When-Free messaging architecture in accordance with an aspect of the present invention.

The present invention relates to a system and method to facilitate communications between parties, based on a consideration of context of a user, where context is taken to include such background information as a user's appointment status encoded on a user's digital calendar and information that is sensed locally through sensors on or near a device. Based upon a message receiver's availability (e.g., based upon bounded deferral policy), the present invention provides a When-Free messaging architecture that allows message sender's to encode a preferred time horizon for a message to be received. If the message is not received in the time horizon due to the receiver's availability, the message can be automatically retracted before bothering the receiver with a message interruption. Status can be exchanged in a bi-directional manner to facilitate further communications.

It is noted that the When-Free architecture described above can support several communications scenarios or applications relating to substantially any type of messaging including electronic text messages as well as traditional analog communications. For instance, in a Sender-guided Scenario with "WhenFree" messaging, the responsibility for courtesy is the responsibility of senders; that is, senders are allowed the option of sending an Instant Message (IM) that only breaks through to recipients, or comes to their attention, if they are present, or are free per their own definition of busy, free policies. Thus, the IM is given a time to exist before expiring, e.g., as a default (e.g., 5 min.) or a specially set flag at send time. The following illustrates some possible examples:

WhenFree "Rick, would you like to get lunch?"->Expire 15 min. In this example, the message evaporates completely (without breakthrough to the user or indication it has been sent) if the user hasn't seen the message (e.g., is not present) or remains in busy state. Thus, WhenFree messaging can lower the bar on people feeling comfortable in sending IM to others.

In another application, receiver-defined policies can be employed, and links between expired IM and email can be provided. In this situation, a policy is defined by the receiver for handling the incoming instant message, and allows for simple policies that handle IM, when the recipient happens to be busy or away. This captures situations where a recipient is unavailable for an initiation of an IM by a sender or unavailable, e.g., at the tail end of an established back and forth of an IM (there is a large pause, etc) due to a user becoming busy, becoming involved in an instant messaging session with another user, stepping away, etc.

In these situations, users can specify, for example:
1. My "Unavailable" Contexts
e.g., I am not available if:
I do not respond to an IM within x minutes or
I haven't been active at my desktop for more than x minutes or
I am busy in one of the following state examples:
I am having an ongoing IM with someone else (Sent or received an IM conversation from someone else within x minutes)
Desktop state (Specify an application in foreground, e.g., Composing an email in Outlook, Active in Powerpoint display mode, active in Excel, etc.)
Allowed Exceptions:
Allow users to specify exceptions.
e.g., Allow these users to bypass busy states: special list={Steve Smith, Mike Jones, My Spouse, Critical Associates List, Anyone I've IM'd today, Anyone I have sent email to today, etc.)
2. My "IM Unavailable Policy"
If I am unavailable (e.g., from above, "If I do not respond to an IM within x minutes," "If I have not been active on my desktop for x min., etc.) or in one of these busy states (defined in a simple list of states), then (example policies):
[ ] Convert the IM to email and place this email in my inbox
[ ] Generate an IM to the sender with an automatically-generated response saying that I am not available to see or respond to the IM.
[ ] Include the following information (in IM or email auto-response):

As part of user's IM Unavailable policy recipients can specify an auto-response message for all, or for selected people/groups (e.g., from the user's IM Unavailable Communications Whitelist):

e.g., the autoresponse email or IM response tells the sender that the recipient can be reached by email at: tim@hotmail.com, or, this alternative:
[ ] Convert the IM into an email thread, embedding the IM message in an email from me to the sender with a cc: to me
[ ] Include the following information (in IM or email auto-response):

That is, the recipient can specify that for all or some people (per a communications white list), that an email is automatically generated to the sender with a cc: to the recipient, with the initiating IM embedded to allow a thread to be continued later in email, or IM right from the email message, per the preferences of either the recipient or the sender. This approach always shifts IM Busy situations to an email that can later be followed up in email or IM. (At time of reading email, the user's current availability for IM can be displayed in place, per Messenger presence status). This would allow for a nice mesh of IM and email, allowing for a shift of mode, or re-establishment of IM later. Also, a uniform policy for unavailable and for action policy, or (e.g., later) introduce a special "white communication list" list of colleagues) and specify selective unavailabilities (e.g., for Others), and action policies.

In another application situation, similar When-Free policies can be applied (both the sender directed or the receiver-defined policies) in push-to-talk scenario's. Push-to-talk is becoming popular but suffers from similar problems of IM on both sides of communications (receiver guided, sender guided). In a specific example, consider the case where a push-to-talk communication device is employed by a first construction contractor to speak to another contractor at another job site, whereby both communicators get busy. If the first contractor is busy, e.g., talking with someone else, the WhenFree method can be supported in several ways. In one approach, the rendering of the push-to-talk message is suppressed and held in local buffer, and is rendered if it can be if the recipient contractor becomes free within a pre-determined amount of time. If it cannot be sent within the allotted time, the message can be erased with an automated pre-recorded message back to the sender, informing the sender that the last message did not get through, and/or giving the option to the recipient (per pre-determined policy) or the sender to have the message converted into a form that can be reviewed later, e.g., a media snippet in an email, a voice mail in an inbox, saying "You missed this message today at the end of a conversation with Sam; " ", and so forth.

In another approach, rather than having the message erased if it goes over time, a recipient may set up a policy that sends back an automated recording telling the sender that they are busy right now, and the message has not been delivered yet, and to inform the caller, that they will be told when the message is rendered. In another approach, after a time-out and a potential automated response about unavailability of the recipient's phone or account, messages may be kept locally by a recipient's device or server. The recipient may later review messages suppressed because of their unavailability or current cost of interruption, and decide to respond then, either manually, by calling back the partner in the prior conversation, or via an automated tool for re-establishing context. Such automated tools can provide easy context re-establishing tools such as, allowing the recipient to invoke with a single push, a conversation re-establishing probe: "[Canned audio]: Revisiting conversation with Robert, in regards to [Recorded from Sam]: "Robert, I think we should just go with the red ceramic!" at which point Robert and Sam can pick up the conversation.

As used in this application, the terms "component," "service," "model," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to deterministic or logical reasoning techniques, including methods employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 illustrates a "When Free" architecture in accordance with an aspect of the present invention. The system 100 includes a message sending component 110 that sends messages to a recipient at an endpoint device 120. The message sending component 110 can include substantially any communications device or component such as an instant messaging system, telephone or cell phone, e-mail, voice mail, and so forth. Messages sent in accordance with the present invention include one or more properties for controlling how, when, and if a message is sent or transmitted to the recipient's device or component 120. In one aspect, messages can be sent with a time-to live (TTL) property as illustrated at 130. The TTL property specifies how long the sender intends the message to be active (e.g., in a temporary message queue in a client or server) before the message is revoked from actually interrupting the user. For example, a user may send a message at the sending device 110 stating "Are you available for a meeting in 10 minutes?" In conjunction with the message, the user may configure a TTL parameter for 10 minutes that is transmitted with the message. Such configuration can be achieved via a user interface 140 which can also be employed to compose the message. Alternatively, messages can be automatically analyzed for voice or textual queues on how long a message should remain active before withdrawal.

Referring to the previous example, if the user is not available to receive the above meeting message in 10 minutes, then the message for the meeting can be automatically revoked without having interrupted the user or intended recipient of the message. The intended recipient's availability for receiving messages can be determined in a plurality of different processes such as via information obtained from the recipient's calendar. In one aspect, a bounded deferral component 150 is associated with the endpoint device 120 that determines periods of availability for the message recipient. Thus, given the above example, the bounded deferral component 150 may determine that the user is available to receive a message in 5 minutes. At the end of the 5 minute period, the user would receive the example meeting message above since the message remains available for reception until the message exceeds it's designated TTL period (e.g., 10 minutes), or it is determined the recipient will be unavailable for a period greater than the TTL period. As will be described in more detail below, various status information can be exchanged between message senders and receivers indicating potential likelihood of success or failure of the message being sent as well as other indications for non-intrusive communications.

Figure 2:
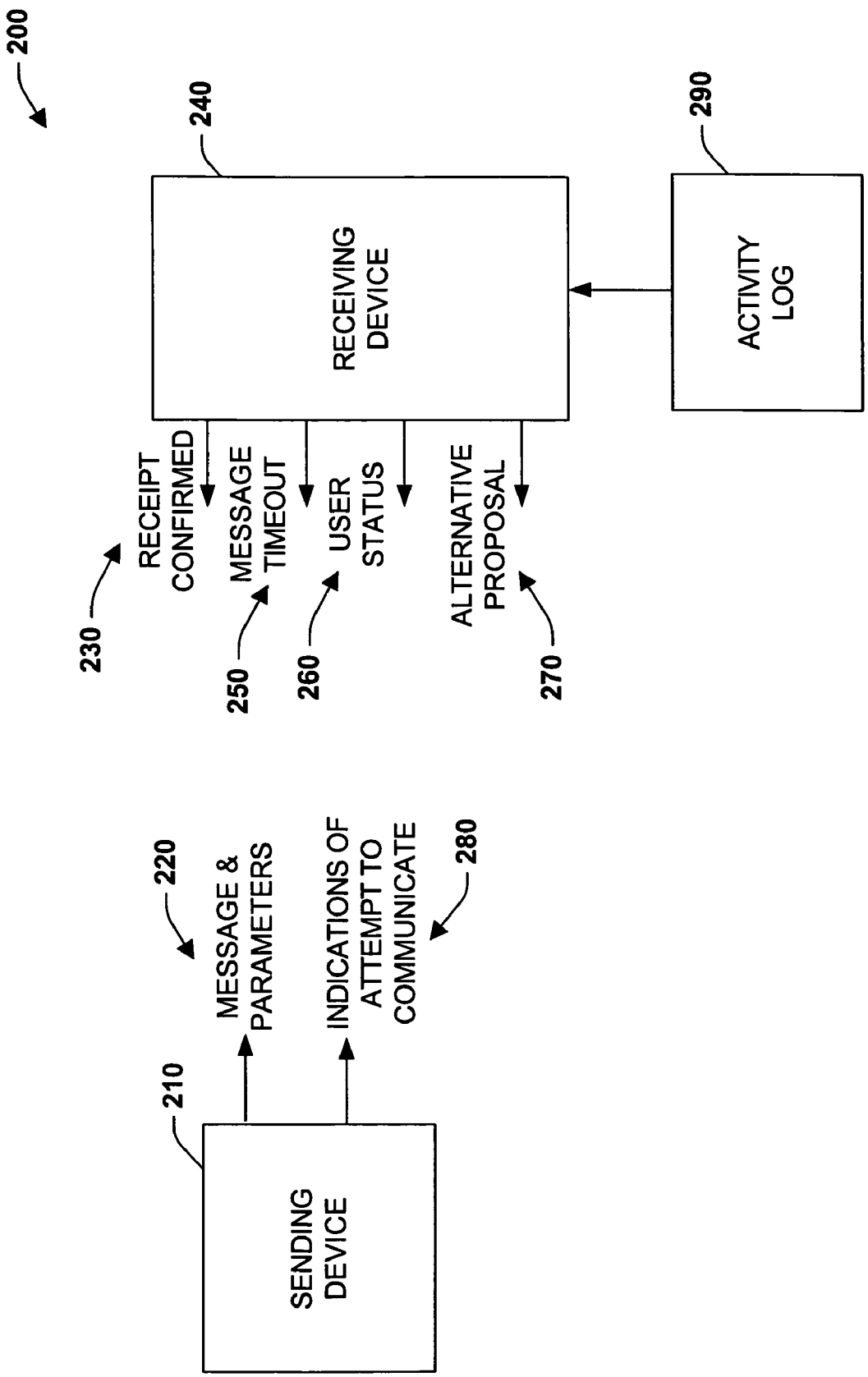
FIG. 2 is a block diagram illustrating example status exchanges in accordance with an aspect of the present invention.

Referring to FIG. 2, a system 200 illustrates example status exchanges in accordance with an aspect of the present invention. As noted above with respect to FIG. 1, When-Free messaging allows users to send When-Free messages, that act as near-instant messages that wait until a user or recipient is not in one of a list of states defined as busy states. A sender can encode, with a quick gesture or via a standing profile, how long a message is to remain alive before being erased or retracted, such that a sender can send a message. This is illustrated at 210 where a sending device transmits a message 220 having an encoded parameter or parameters. For example, the message 220 could appear as When Free: "Hello, do you want to grab lunch" (Time to live (TTL): 10 minutes). Thus, the message 220 will only get through if the recipient becomes free within the TTL horizon. A message received confirmation can be optionally sent at 230 when the message is rendered from a receiving device 240, or, in cases where the message 220 has not made it through to the recipient by the time the lifespan of the message is up, a note 250 that the message timed-out and was erased may be sent to the sender 210.

Recipients via the receiving device 240 can specify that messages that are near timing out can break through to them rather than timing out, if desired, as well as enable pending availability status 260 to be transmitted as feedback to the message sender (e.g., I will be available for messages in 15 minutes). If the recipient has configured the receiving device 240 for break-thru messages, for example—if the message is of high enough priority or from a selected sender subset, an alternative proposal can be sent at 270. For example, "I am available to meet in 20 minutes." In addition to parameterized messages 220, the sending device 210 can send subtle clues as to who may be attempting to contact the recipient at 280 (e.g., an image of the sender or text indicating that an instant message is in the queue). An activity log 290 can also be provided, wherein the message recipient can periodically check a log file that indicates the amount of messages sent, message content, and identity of message senders that may have attempted to communicate but failed. This can also include logging all message activities including successful communications attempts as well as unsuccessful attempts.

Figure 3:
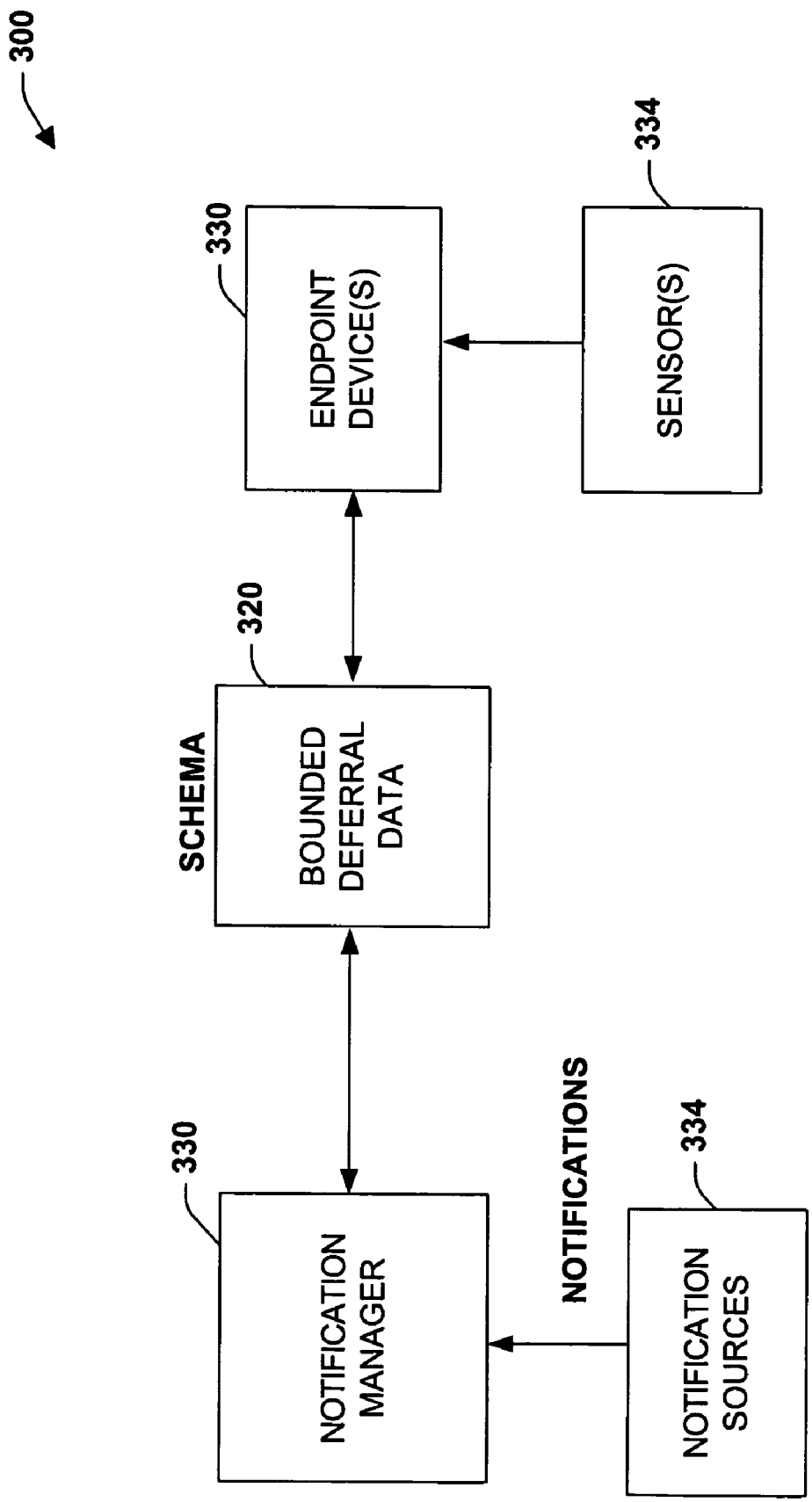
FIG. 3 is a schematic block diagram illustrating endpoint device communications in accordance with an aspect of the present invention.

Referring now to FIG. 3, a system 300 illustrates endpoint device communications in accordance with an aspect of the present invention. One or more endpoint devices 310 are associated with one or more sensors 314 (e.g., motion, proximity) and bounded deferral data 320 in order to facilitate communications with a user. The bounded deferral data 320 is typically determined and generated by a notification manager 330 that routes notifications from various notification sources 334 to the endpoint devices 310. It is to be appreciated that the endpoint devices 310 may also determine bounded deferral data 320 in accordance with the present invention.

Bounded deferral data 320 for the endpoint devices 310 is determined in consideration of a tolerated period, called a deferral period that is a generally a function of a notification sender and/or a type of message delivered. When messages are received by the endpoint device 310, the device employs its sensors 314 locally to determine a suitable time within an indicated bounded deferral period to alert a user. Typically, the more urgent messages are, the shorter the deferral period. For example, the notification manager 330 may have just received a message from a notification source 324 and attempts to deliver the message in accordance with a bounded deferral period specified by the bounded deferral data 320. Typically, the notification manager 330 makes general decisions about notification routing and relies on the endpoint device 310 to actually deliver the message to the user within the determined deferral period. However, the endpoint device 310 may detect that a user is currently involved in strenuous activity (e.g., accelerometer indicating fast movement). As such, even though a message delivery deadline is approaching as defined by the bounded deferral data 320, the endpoint device 310 may still delay delivery of the message based upon detected activities or attentional state of the user.

It is noted that bounded deferral generally relates to the concept that messages are assigned locally or centrally with a bounded deferral tolerance that dictates a deadline for making a user aware of a message containing information of value to the user, where the tolerance or deferral is dependent on the urgency of the information. Also, a transmission reliability may also be considered, based potentially on locally sensed information which is related to a probability that a message will get through to a user given endpoint sensing and/or estimates given background information as will be described in more detail below.

Bounded deferral parameters can be determined via local sensors, calendar information, an alerting type, and/or time of day, for example to determine that a user is too busy to receive an alert either now or for the next x minutes. If the deadline is reached and the alert has not yet been delivered, it is delivered at deadline. If a deadline will pass definitively (e.g., as determined from calendar information) and there is no sense in waiting for a "better time," then the alert is passed immediately as there is nothing to be gained by waiting.

Sensors can be employed for various determinations such as determining when a user is currently busy and when a user is available to receive messages. Sensors can also indicate us what the transmission reliability is. Such sensor information can be passed directly off to a central notification manager, e.g., a general notification platform that is deliberating about where to send messages, or in another application, an endpoint device itself can compute a transmission reliability (abbreviated as transrel) from its sensors and pass back the summary transmission reliability to a central notification manager which considers this in its deliberation. For example, a temperature sensor on a cell phone can indicate to the cell phone that it is indeed in a user's pocket right now, thus there is a high transrel to vibrating or ringing the cell phone to get through to the user.

In a conversational dialog system or aspect to the present invention, concepts of bounded deferral can be used to allow a system that performs interactive dialog, either to initiate a conversation or to continue a conversation that has been interrupted by the user's attention being diverted elsewhere for a task or another conversation. For example, in the case of an automated system that is working with a user on a task, whereby a dialog has been broken by someone stepping into a doorway and talking with the user, the system can wait to continue a certain amount of time before, apologizing and breaking in to continue, depending on the time-criticality of continuing the dialog.

It is noted that bounded deferral can be linked to many aspects of a user's experience. For example, bounded deferral policies can be linked to calendar information, where appointments are taken as deterministic bounds on a user's availability (e.g., "user's appointment is ending in 10 minutes; thus it is okay to wait," versus, "user's appointment is ending in 20 minutes; the end of the appointment or task comes after the deferral tolerance. Thus, it is best to simply break in and alert the user immediately). Beyond calendar information, computing systems may be able to access information about the duration of other tasks. For example, tasks of predetermined length may be available in contexts where a user is reviewing media (e.g., a movie or play being watched by a user will end in 7.5 minutes, a commercial break will come at 14 minutes, etc.).

Similarly user's can specify various options about their availability based on the time of day and day of week (e.g., a user may specify in preferences encoded in a notification manager, "Don't relay an alert to me before 8 am and after 11 pm unless you reach a deadline per the deferral tolerance associated with an alert."). A system can thus be charged with attempting to wait, and to hold off on alerting if possible, until the preferred period of time (e.g., between 8 am to 11 pm), but if it cannot wait, it will break through at other times. Also, bounded deferral policies can be dependent on the type of alerting (e.g., device may vibrate gently immediately but if there is no confirmation before the deferral tolerance has been reached, the device alerts the user with a loud tone).

In another approach, rather than breaking through when a deferral tolerance has been reached, the endpoint device can be instructed to send a message back to a central notification manager or the sender of the alert, informing the notification manager that the device was unsuccessful at relaying the message.

It is noted that the notification manager 330 and endpoint devices 310 may employ decision-theoretic approaches when guiding or interrupting notifications to users and are described in more detail below. Global bounded deferral policies can be viewed as approximation of more detailed decision-theoretic analyses. In detailed decision-theoretic analyses, alerts are handled on a case-by-case basis, considering the detailed costs and benefits of alerting for each message and context. Bounded deferral policies allow for the specification of bounds on the total delay, and thus, total loss in the value of information with time for messages of different urgencies. When considering multi-message interactions, such as when a message breaks through to the user, other parties can be allowed to come through as well, even if they would not have broken through to the user on their own. In one example, a value for multiple messages may be determined that leads to a shorter deferral, e.g., the sum of the value (or other function) of the value of independent messages.

Also, a system that has been holding back on several messages that have relatively long deferral tolerances (as they have low time criticality) that have not yet been met, may share the less critical messages at the time that a more time critical message, with a shorter deferral tolerance breaks through to a user. Such breakthroughs may incur most of the cost of information sharing, allowing other messages to pass through at low incremental cost. For example, consider the case where an alert about a meeting reminder to a person breaks through with enough time for the user to travel to a scheduled meeting, based on the user's current location and the location of the meeting. At the time of the breakthrough, the cost of receiving additional messages may not be significantly greater than the initial breakthrough cost. Thus a system, may alert the user with a message, "You have a meeting at the Doubletree Hotel in Bellevue in 20 minutes," and then after this alert is rendered and processed, share with the user messages of lower time criticality, "While I have your attention, tomorrow is Steven's birthday, and Joe Jones will be coming to town next week."

In order to route notifications to the user, the notification manger 330 and/or endpoint devices 310 can include one or more models for reasoning about user states (e.g., attentional state, busyness). Such models can include substantially any type of system such as statistical/mathematical models and processes that include the use of Bayesian learning, which can generate Bayesian dependency models, such as Bayesian networks, naive Bayesian classifiers, and/or Support Vector Machines (SVMs), for example. Other type models or systems can include neural networks and Hidden Markov Models, for example. Although elaborate reasoning models can be employed in accordance with the present invention, it is to be appreciated that other approaches can also utilized. For example, rather than a more thorough probabilistic approach, deterministic assumptions can also be employed (e.g., no cell phone activity for X amount of time may imply by rule that user is not available by phone). Thus, in addition to reasoning under uncertainty as is described in more detail below, logical decisions can also be made regarding the status, location, context, focus, and so forth of users and/or associated devices.

Figure 4:
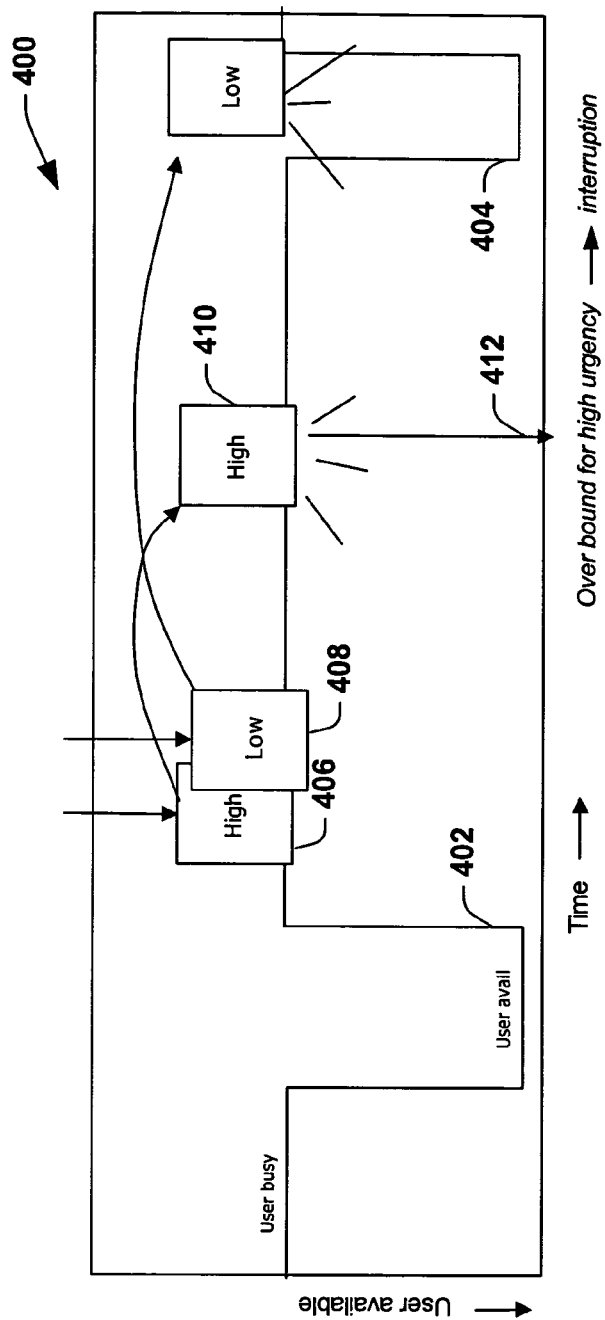
FIG. 4 is a diagram an exemplary bounded deferral policy in accordance with an aspect of the present invention.

Referring now to FIG. 4, a diagram 400 illustrates an exemplary bounded deferral policy in accordance with an aspect of the present invention. According to this aspect, notifications or messages are not typically delivered until an available free state is reached unless a time bound is detected. For example, free states are illustrated at references 402 and 404. During busy states of the user (depicted as opposite to the free states 402, 404) a high and low priority message 406 and 408 are queued by a notification agent or manager (not shown). At 410, a time bound that was set as a max deferral time is reached for the high priority message and thus the high priority message is delivered to the user at 412. The low priority message 408 does not reach a time bound in the illustrated example of FIG. 4. Thus, the low priority message is not delivered until the next available free state at 404. In this manner, disruptiveness of notifications received by the user is mitigated. It is noted, that the time bounds can be influenced by the users context such as workload, number of messages received, and the time dependency of the notification content.

In accordance with the present invention, various algorithms and/or processes are provided for desktop and endpoint device alerting. These processes can be applied to multiple situations such as: (1) User present at desktop or endpoint device; (2) User away from desktop or endpoint device; and (3) User just returning or logging in to a desktop or endpoint device after being away.

For the case where a user is detected to be at a desktop or endpoint device, the following process can generally be applied:

1. When a notification is received, its age is set to zero and its priority is noted and a list of exceptions is checked.
2. If a "likely available" state is observed via monitoring the user's activities before the max deferral time for that urgency, the notification is passed through to the user.
3. Else, the notification is relayed when the deferral tolerance is reached for the notification as depicted above in relation to FIG. 4.

On average, because of the typical smatter of "likely available" states during typical desktop or endpoint device activities, most notifications will tend to be delivered before the max deferral times. However, user's will be more pleased on average with the notification system as notifications will tend more so to occur when the user is free than they would have been had notifications simply been passed through when notifications are received. The probability that a free state will be reached generally increases with time—as there are more opportunities for detecting a likely available state with increasing amounts of time. As the probability of a likely free state increases with increasing amounts of times, lower priority messages will tend to occur with higher-likelihood during these likely free states, and the probability of being disrupted will grow with the increasing priority of the messages.

According to another aspect of the present invention, a display of notifications (e.g., journal, browser, in-box, cell phone message box) can include multiple, or pooled notifications that have been waiting, so as to send to the user a single notification that contains chunks of grouped notifications. Such chunking can present the chunks of notifications in lists ordered by max priority, max age, or max priority by group, etc. For example, if a likely free state has not been detected, and that max deferral time has been reached by a high priority notification, and at the time the max deferral has been reached for the high priority notification, information can be included about the lower priority notifications that are pending in a grouped notification—even though the lower priority notifications will not have obtained an associated max deferral at this time. Several aspects are possible for this kind of chunking, including sending the main alert in a standard notification display, and summarizing other pending alerts in a list at the bottom of the display. Respective items can be clicked on and be reviewed and/or cleared by the user.

According to another aspect of the present invention, a calendar can be examined to enable users to specify uninterruptible meetings (e.g., presentations, video conference, phone meetings) that should not be interrupted (e.g., until some safe time, 10 minutes after end of meeting) except for notifications that are marked as immediate pass through. This can be generalized to utilizing a separate max deferral table and/or function for important meetings. This can be further generalized by enabling calendar items to be one of several classes of appointment and employ different max deferral tables or functions for different classes of meeting.

In another aspect of the present invention, instead of providing a few categories of priority, a continuous range can be provided, such as, 0-100 for an urgency score and the max deferral can be a function of the priority of the notification, including a variety of linear and nonlinear functions (e.g., exponential decay of max deferral time with increasing priority). For example:

$$\text{max deferral(priority)} = e^{-k(priority)} \times 15 \text{ minutes}$$

which is equivalent to $$\text{max deferral(priority)} = e^{-k(priority)} \times \text{max deferral}(0 \text{ priority})$$

Additionally, users can specify contexts as a function of type of day (e.g., weekend, holiday, weekday), time of day, and other basic contexts that change value assignments for different classes and subclasses of message (e.g., e-mail, instant messenger communications from family versus business associates).

In another respect, a Notification Journal for items that have not yet been observed by the user can be provided. This can include maintaining a global Notification Journal for substantially all notifications—enabling users to return and access notifications that have been previously received, for example. This can also include providing for rich display and interaction. For example, a click on a journaled item in a Notification or endpoint device Window can bring up the notification. A click on the notification brings up more information or the appropriate user interface for the source of the notification. For example, clicking on a notification about an upcoming appointment brings up a full view of an appointment being referred to by the notification. Also, highlighted links can be displayed within notifications and enable users to jump to web pages, applications, or information associated with the notification. Furthermore, advertisements, special backgrounds and/or other branding information (from the source) can be displayed in the notification window, when a notification is rendered.

In another aspect, notifications with active durations, and/or with expiration dates, can be removed from an active queue after the date has passed. Notifications in a journal can be listed as expired if users are interested in seeing the history of this kind of activity. In addition, classes of notification can be tagged as being intrinsically replaceable by any update of information as identified by a Globally Unique Identifier (GUID), for example, in order to provide an update on the world state of information that the notification is reporting.

User Interface tools can be provided that enables users to append priority information to messages, or, more simply to do a normal Send or a When Free send. A When Free send would be ported through the bounded deferral system described above; a normal send can act as a non-bounded communication. Notifications can also be tagged with application-specific (or life-specific) contexts from a set of contexts (e.g., MS Word at focus, MS Outlook at focus, etc.) and render the notifications within the active context if it has not expired. For example, an assistance tip about a word processor usage rendered via a notification system should generally be provided when the word processor is at focus. If the application is not at focus, the tip should simply be journaled.

More advanced features can also be provided. For example, a frequency of "likely available times" for a user can be observed and learned, when users are working at a desktop or using an endpoint device, and the frequency with which alerts are received by the user in each class, and infer the expected time until the next likely free state, from a user's activity (based on application, time of day, expected user location, etc.). This information can be employed to automatically set the max deferral times for a respective notification priority class so as to enable the notification system to bound the probability of being disturbed for each priority class of alerts. This can be set by default, or can enable users to specify a probability for each priority class, and thus, inform the system that they do not want to be disturbed (that is, alerted when busy) for more than say, 5% of the time for low priority alerts and more than 10% of the time normal priority alerts, and 25% of the time for high priority alerts, etc. That is, users can specify a target "tolerated probability" of disruption for a respective priority class and the system can set the max deferral times for the classes.

Confirmation can be received that important notifications have been observed, for example, a convention can be employed that hovering over a notification is a signal that "I got it," and utilize this feedback as an option that a user can turn in via a profile. That is, users can opt to turn on the option:

[ ] Continue to notify me about critical information every [x] minutes until I confirm with a mouse over or keystroke on an endpoint device.

When a user has been away from a desktop device for more than x minutes (set as default or by user specified amount of time), desktop events can be deferred, and instead notifications can be sent to a mobile or endpoint device. Similar max deferral times can be employed as specified for desktop alerting, or instead access an alternate set of max deferral times for the "away" condition. That is, another table or function for controlling the max deferral time for the away situation can be employed.

Similar to the desktop situation, the user's calendar can be accessed for uninterruptible meetings, such as presentations, or other meetings that should not be interrupted except for notifications that are marked as immediate pass through. Similar generalizations per the calendar as described above in the desktop setting can be employed, such as utilizing information a respective manner that is provided in desktop settings or have special generalizations for the mobile or endpoint settings.

In another aspect, set time of day constraints can be provided to restrict notifications during certain times (e.g., late at night and early morning, weekends). Users can specify classes of alerts they will receive to certain times. For example, all business related email and stock information will not be sent to a mobile device on weekends.

Messages sent to a cell phone or pager can be journaled by a notification manager and available when the user returns to the desktop in a notification journal view—or accesses a journal view on the mobile or endpoint device. Similar chunking of alerts can be employed for the mobile setting as for the desktop, described above.

Mobile or endpoint devices such as embedded auto personal computers (AutoPCs) and appropriately instrumented hand-held personal computers (HPCs) (i.e., that have accelerometers) can be employed with the present invention. For these devices, presence information is used to infer they are active based on touch and/or acceleration, for example. A list of likely free states is created for some significant and/or distinct mobile settings (e.g., a set of states each for the case of driving and for walking). For example, for driving, free states can include "just stopped at a red light or other stop and there's no conversation," or "cruising at a relatively constant velocity," for example.

Other systems can also consider different levels of attention (e.g., considering speed, complexity of breaking, steering, etc.) For HPC's, it can be inferred (e.g., Bayesian inference) with accelerometers that a user is in a car, and infer similar distinctions without direct feeds from an onboard automobile computer. For HPC's, it can be detected when devices have just been picked up, when walking or running has just ceased, or conversation has ceased, or when the unit has just been placed down to rest. For such mobile or endpoint devices, notifications can be cached locally and rendered per likely free states. If there are no detectable two-way connections, such information can be provided in a journal such as a desktop Notification Journal as having been sent to the mobile device. It is to be appreciated that a Notification Journal can also be maintained by the endpoint device.

Users can configure the notification system so that when a user first returns to a desktop (or laptop device) after an "away state" has been detected, a single notification can be relayed, the mobile notification journal, and enable users to select particular items to view the notification that would have been observed if the user had been at the desktop. For example, users may not have a mobile device, or not have the mobile device in service, or desire to simply specify that the notification system to work in a "desktop only" modality. In this case, the following can be performed:

When the notification system notes that a user has transitioned from a "user away" to a "user present at desktop device," users are presented with a notification journal for all notifications that have gone over the max deferral time while they were away—or, per a user's preferences, foregoing the max deferral time and post all alerts to such a journal (e.g., sorted in a variety of ways per user preferences, by message class, by priority, or by date, or such combinations as message class containing the highest urgency alert, sorted within class by priority or by time, etc.). When the user is detected to be away, notifications can additionally continue to post on the desktop (e.g., in a pre-assigned area) a notification journal and continue to populate the journal (and sort by priority or by time of notification) with notifications that have gone over their max deferral time—or, alternatively foregoing the max deferral time and post substantially all alerts to such a journal. When such a journal is present, the user can be alerted with an audio cue—upon return or log in—that a journal is waiting for them. The display suppressed and rendered as an audio cue upon return and have the user take action to bring up the journal. In settings where users have been utilizing a mobile device, a journal can automatically remove journal items from the desktop journal when they are sent to the mobile device, or mark the notifications as having been transmitted to the mobile device, in order that users can sort and/or quickly scan for items they have not yet observed. Rather than posting a journal, a decision can be made to display a notification journal, chunked alerts (per the chunking policy mentioned above), or a single alert, depending on the quantity of journaled items.

Additionally, users can be enabled to specify that the notification system delay such a "display upon return" policy, and allow users to get to work when they return (to avoid the frustration with being hit by alerts when they desire to return and get something done), and/or wait for the next "likely free" state to appear. A special "pass through" can be provided for notifications immune to such suppression. For such a functionality, additional "likely free" state to be can be defined as: "user away and returns and does not begin active work with an application or with the system." That is, it can be detected if users, upon returning to their desktop or endpoint device, begin work right away, and instead, wait until a "likely available" state is reached. If the user returns and does not begin work, this new likely free state is noted and thus causing a display of the notifications that are pending. If the user returns and is busy, the system can display notifications that have exceeded their max deferral, or, per user preference, display nothing until the next "likely free" state appears. At this time, the journal, chunked alerts, or single alerts are displayed to the user, depending on the quantity of journaled items.

Users employing a mobile or endpoint device may have the device turned off or be in a region without service. Turning on the cell phone may eventually work in a similar manner as returning to a desktop. That is, a journal view of unseen alerts may appear and users can browse and bring up respective alerts. Other aspects of the present invention can enable desktop journals to be updated when messages are reviewed on a mobile device, for example.

Figure 5:
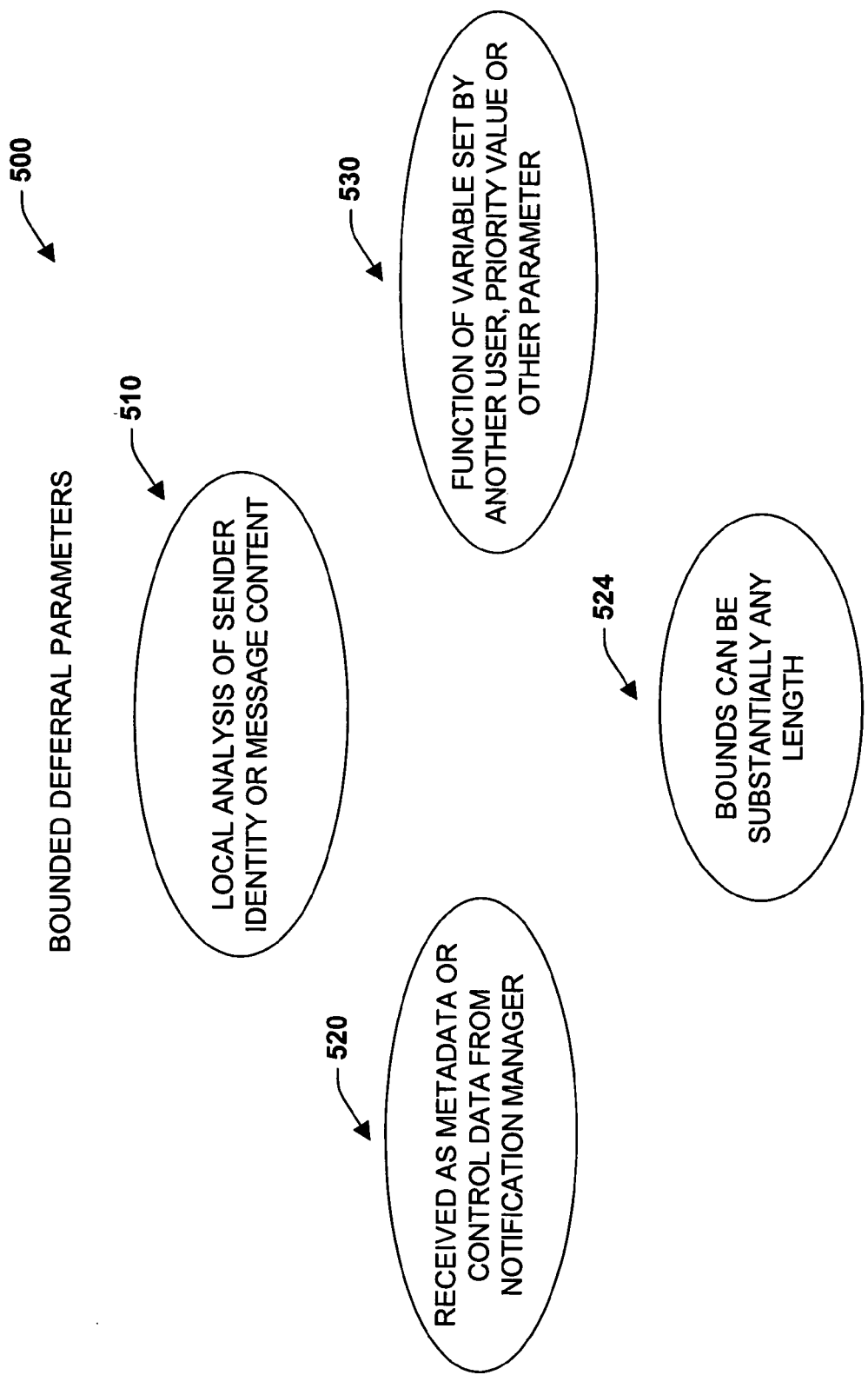
FIG. 5 is a diagram illustrating exemplary bounded deferral parameters in accordance with an aspect of the present invention.

Turning to FIG. 5, a diagram 500 illustrates exemplary bounded deferral parameters in accordance with an aspect of the present invention. At 510, parameters on bounded deferral can be locally computed or determined based on local analysis of identity of a sender or nature of message content. At 520, these parameters can be received as part of metadata or control data from a central notification manager (i.e., the bounded deferral or recommended bounded deferral can be included in a notification schema of the message). At 524, deferral parameters can be a simple function of a variable set by another user (e.g., a priority flag set by message sender to indicate urgency of message) or a function of a priority value or other parameter set by a notification manager. At 530, parameters can include bounds that are substantial—just wait for a good time, and/or erase or log if too late (over some deadline for expiration).

Figure 6:
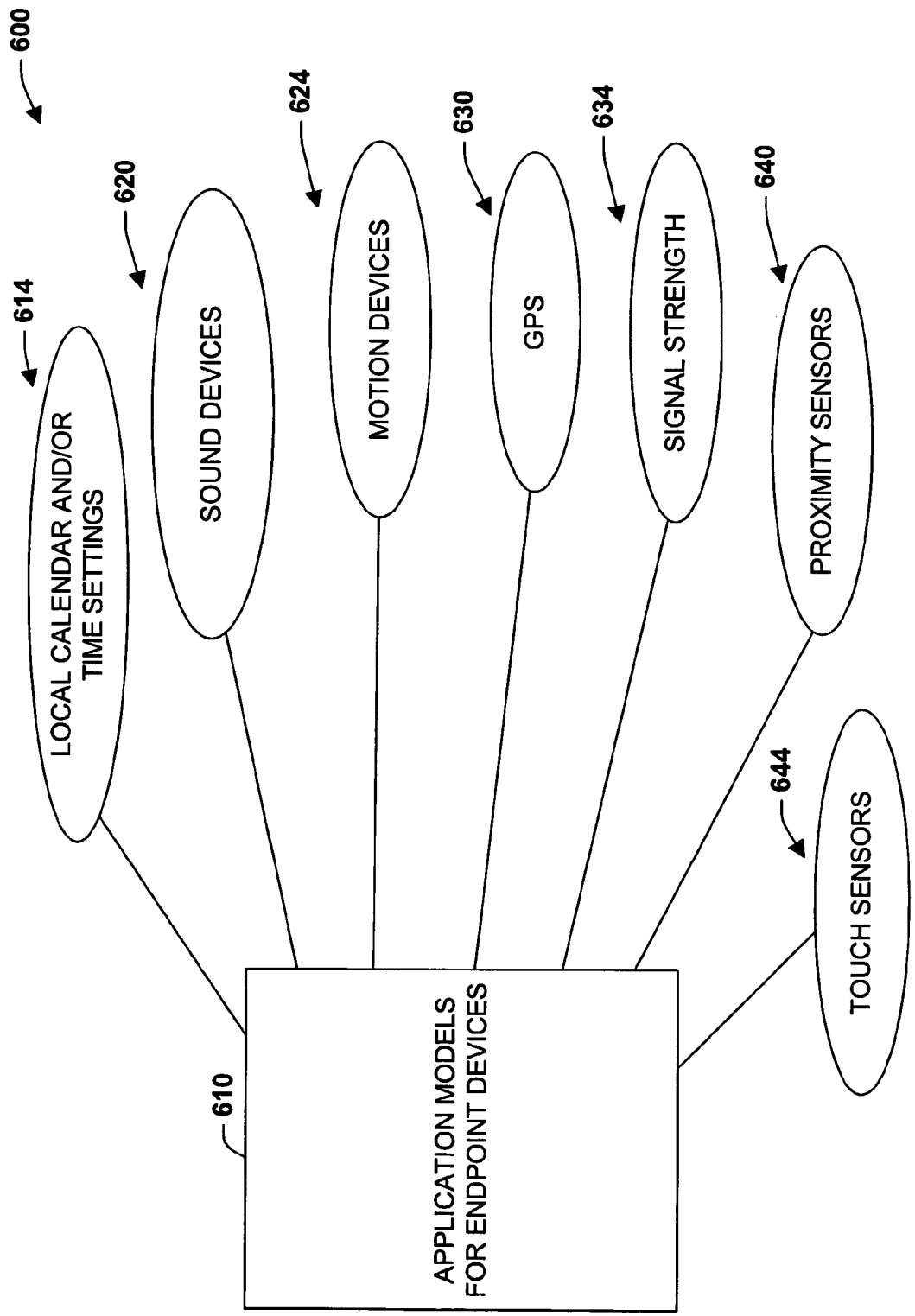
FIG. 6 is a diagram illustrating application models for endpoint devices in accordance with an aspect of the present invention.

Referring now to FIG. 6, a system 600 illustrates various application models 610 for endpoint devices in accordance with an aspect of the present invention. The application models 610 describe some example sensing components that can be employed by endpoint devices. Sample applications 610 include use of local calendar information at 614 to guide a device to hold alerts until after a movie or show, or other meeting has ended. At 620, microphones or other sound receptors can be employed to sense when someone has stopped speaking, or other loud background noise, e.g., car driving noise, car radio, etc.—attempt to defer alert until a period of quiet greater that t within a bound. At 624, motion devices such as accelerometers sense when a car has stopped, e.g., at a red light or stop sign for an alert to be rendered, e.g., within a bound; person has stopped walking, talking, etc.

In one example, applications consider the notion of ringing after bound is reached and then again as backup after quiet, etc. or other sensor condition. Another case waits until a person is in proximity or has touched a device before delivering a notification. Application models 610 can also consider automated deferral of phone In a simple case: Silence first few when rings quiet, while waiting for speech to stop. A more elaborate case employs an agent picking up a phone if a user is sensed to be temporarily busy and asking the user to hold on for just a bit (the bounded deferral for a call), then buzzing through when either user has stopped speaking or the bound has been reached, (e.g., a minute) . . . coupling this, with, "please hold on for just another 30 seconds . . . still trying." If this fails, directing callers to an answering machine or piping the caller through to the user. This concept can be coupled with performing phone ringing deferral only for special people or people within specially indicated groups ("People I am meeting with within an hour, etc.") Other sensors that may be employed by endpoint devices include Global Positioning Systems (GPS) at 630, 802.11 signal strength sensors at 634, infrared proximity sensors at 640, and touch sensors at 644.

Figure 7:
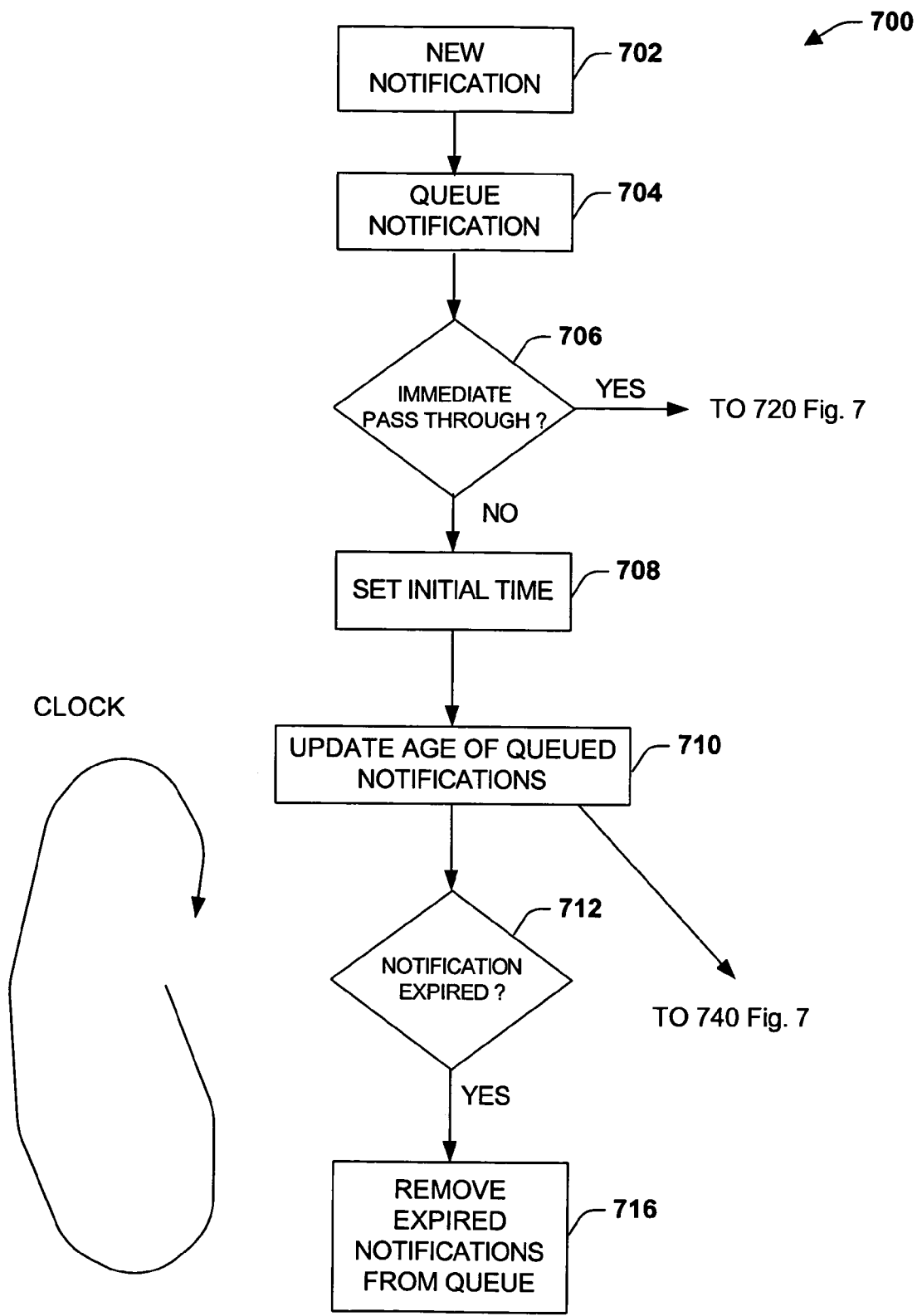
FIGS. 7 and 8 are flow diagrams illustrating bounded deferral processing in accordance with an aspect of the present invention.
Figure 8:
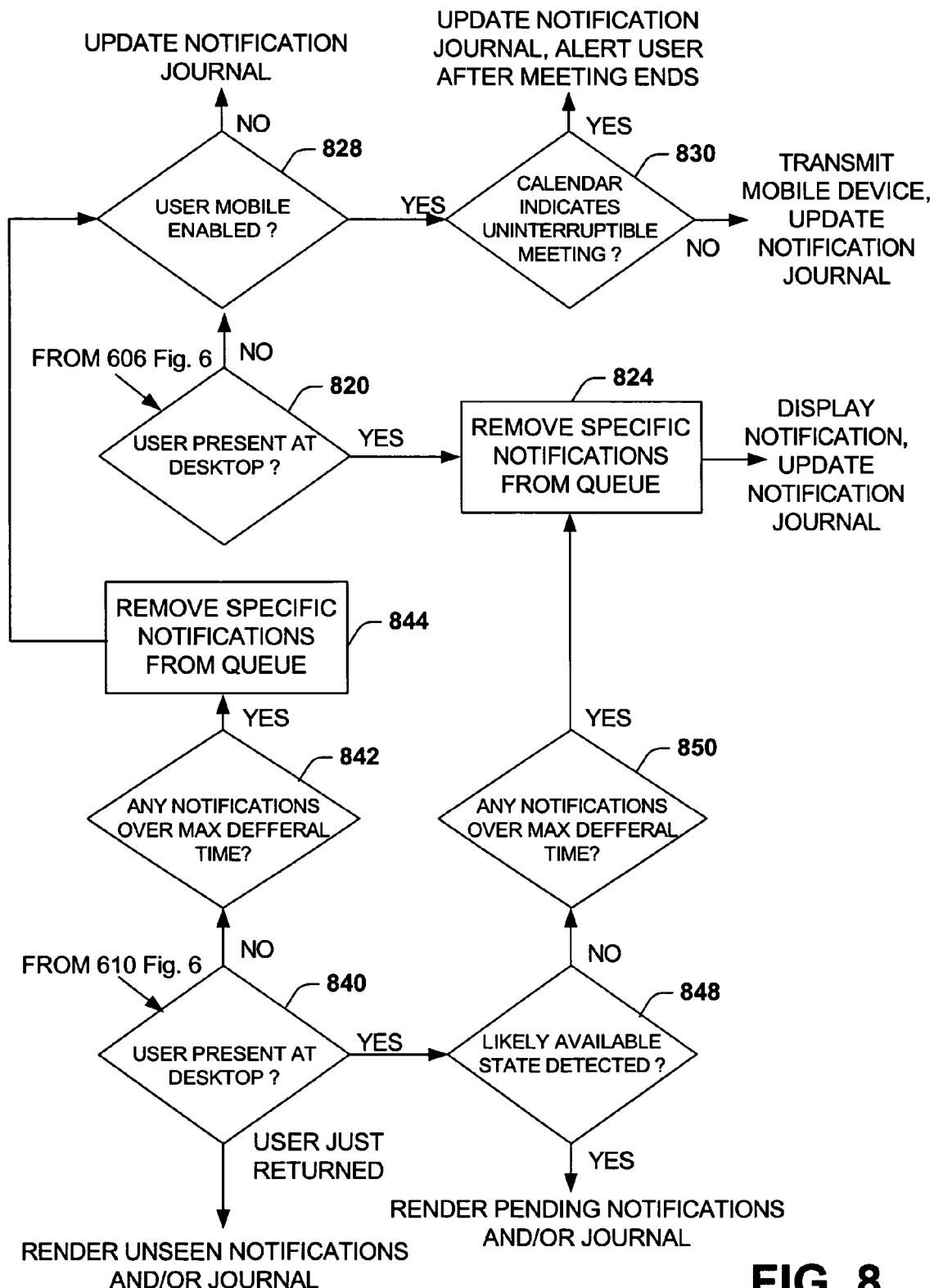

FIGS. 7 and 8 illustrate methodologies for providing bounded deferral notifications in accordance the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 7, a new notification is received at 702. At 704 the received notification is placed onto a message queue. At 706, a determination is made as to whether the received notification should be immediately passed through to the user. This can be achieved by observing a setting such as a flag indicating whether the notification should be passed through. If the notification should be passed through, the process proceeds to 820 depicted in FIG. 8. If the notification should not be passed through, the process proceeds to 708. At 708, an initial time is associated with the notification such as a max deferral time described above. It is noted that acts 710, 712 and 716 can be executed as part of a clocked service routine or as an interrupt event, wherein these acts are periodically executed from portions of the process depicted in FIGS. 7 and 8. At 710, the age of queued notifications are updated. At 712, a determination is made as to whether a notification has expired. If so, the expired notification is removed from the queue. If notifications have not expired at 712, the process returns/proceeds to the process depicted in FIG. 8.

Referring now to FIG. 8, a decision is made at 820 regarding the branch from 706 of FIG. 7. At 820, a determination is made as to whether the user is at the desktop or endpoint device. If so, the process proceeds to 824 wherein the specific notification is removed from the queue, the notification is displayed, and a notification journal is updated. If the user is not present at the desktop at 820, a determination is made at 828 whether a user mobile or endpoint device is enabled. If not, the process updates the notification journal. If the mobile device is enabled at 828, the process proceeds to 830. At 830, a determination is made as to whether a calendar indicates an uninterruptible meeting. If so, the notification journal is updated and the user is alerted after the meeting. If such a meeting is not in place at 830, the notification is transmitted to the mobile device or endpoint device and the notification journal is updated.

Referring to 840, a return is provided from the acts of 710-716 depicted in FIG. 7. At 840, a determination is made as to whether the user is present at the desktop or endpoint device. If so, a determination is made at 842 as to whether any notifications have reached the max deferral time set at 708 of FIG. 7. If so, the process proceeds to 844 and removes the specific notification from the queue and proceeds to 828 which has previously been described. At 840, if the user has just returned to the desktop or endpoint device, unseen notifications are rendered and the notification journal is updated. If the user has been at the desktop at 840, the process proceeds to 848. At 848 a determination is made as to whether any likely available states have been detected. If so, pending notifications are rendered and the notification journal is updated. If a likely available state has not been detected at 848, the process proceeds to 850. At 850, a determination is made as to whether any notifications have reached the max deferral time set at 708 of FIG. 7. If so, the process proceeds to 824 and removes the specific notification from the queue and proceeds to display the notification and update the notification journal.

FIGS. 9-12 described various aspects of notification processing and attentional modeling. As noted above, the present invention considers how systems may access and use information about a user's attention. Subtle clues about attention are often available, and a number of these clues can be taken as direct signals about the attentional status of users. For example, sensing patterns of simple gestures such as the touching and lifting of a device in different settings can relay evidence about attention that can be exploited in a number of exciting ways. Moving to higher-precision sensing, the present invention can employ the use of gaze-tracking systems, and signals about the focus of visual attention in a variety of applications. As gaze sensors grow in reliability and decrease in cost, various devices can be utilized that recognize when and how they are interrogated by the spotlight of visual attention.

Nonetheless, there often is uncertainty about a user's attentional focus and workload in light of observations, and about the value of alternate actions in different contexts. Thus, the present invention employs models that can be harnessed to reason about a user's attention and about the ideal attention-sensitive actions to take under uncertainty. Such models and reasoning can unleash new functionalities and user experiences. In some cases, models can be constructed by hand and/or learned from data Bayesian models that can be viewed as performing the task of an automated "attentional detector," working to reveal current or future attention under uncertainty from an ongoing stream of clues. Bayesian attentional models take as inputs sensors that provide streams of evidence about attention and provide a means for computing probability distributions over a user's attention and intentions.

Figure 9:
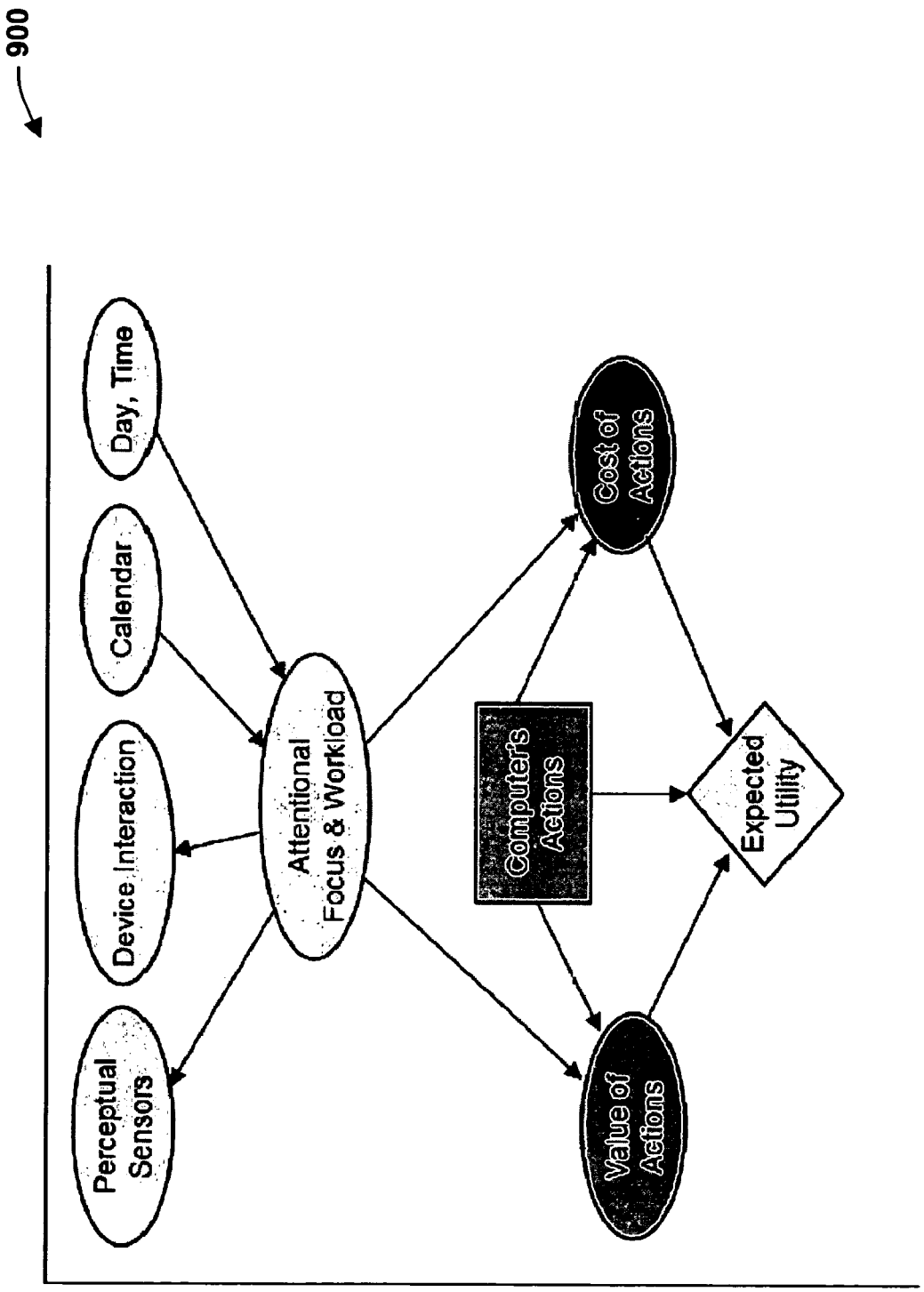
FIG. 9 is an influence diagram illustrating a model of attentional focus and workload in accordance with an aspect of the present invention.

FIG. 9 is a high-level decision model 900 considering a user's attentional focus and workload as a random variable, influenced by the observed states of several sensors. Perceptual sensors include microphones listening for ambient acoustical information or utterances, cameras supporting visual analysis of a user's gaze or pose, accelerometers that detect patterns of motion of devices, and location sensing via GPS and analysis of wireless signals. However, more traditional sources of events can also offer valuable clues. These sources include a user's online calendar and considerations of the day of week and time of day. Another rich stream of evidence can be harvested by monitoring a user's interactions with software and devices. Finally, background information about the history of a user's interests and prior patterns of activities and attention can provide valuable sources of information about attention.

To build probabilistic attentional models 900 with the ability to fuse evidence from multiple sensors, the present invention leverages representations for reasoning and decision making under uncertainty. Such work has led to inferential methods and representations including Bayesian networks and influence diagrams-graphical models that extend probabilistic inference to considerations of actions under uncertainty. Algorithms can be developed which enable computing probability distributions over outcomes and expected utilities of actions from these graphical representations.

FIG. 9 displays a high-level influence diagram representing sensor fusion and decision making in the context of a user's attention under uncertainty. As portrayed in the figure, a set of variables (oval nodes) representing sensed evidence influence a random variable representing a user's attentional status which, in turn, influences the expected value of alternate actions or configurations. Intermediate cost and benefit variables can be introduced with different outcomes. Decisions (rectangular node) about ideal computer actions take into consideration the costs and benefits, given uncertainty about a user's attention. In the end, an expected utility (diamond-shaped node) is influenced by the action and the costs and benefits.

A high-level, pedagogical view can be extended by constructing richer models that contain additional intermediate variables and key interdependencies among the variables. Also, as both devices and people are immersed in time, the present invention goes beyond point-wise considerations of the states of variables, to build higher-fidelity temporal attentional models that represent changing observations and beliefs with the flow of time. This can include dynamic Bayesian networks and Hidden Markov Models for representing and reasoning about states of attention and location over time.

Figure 10:
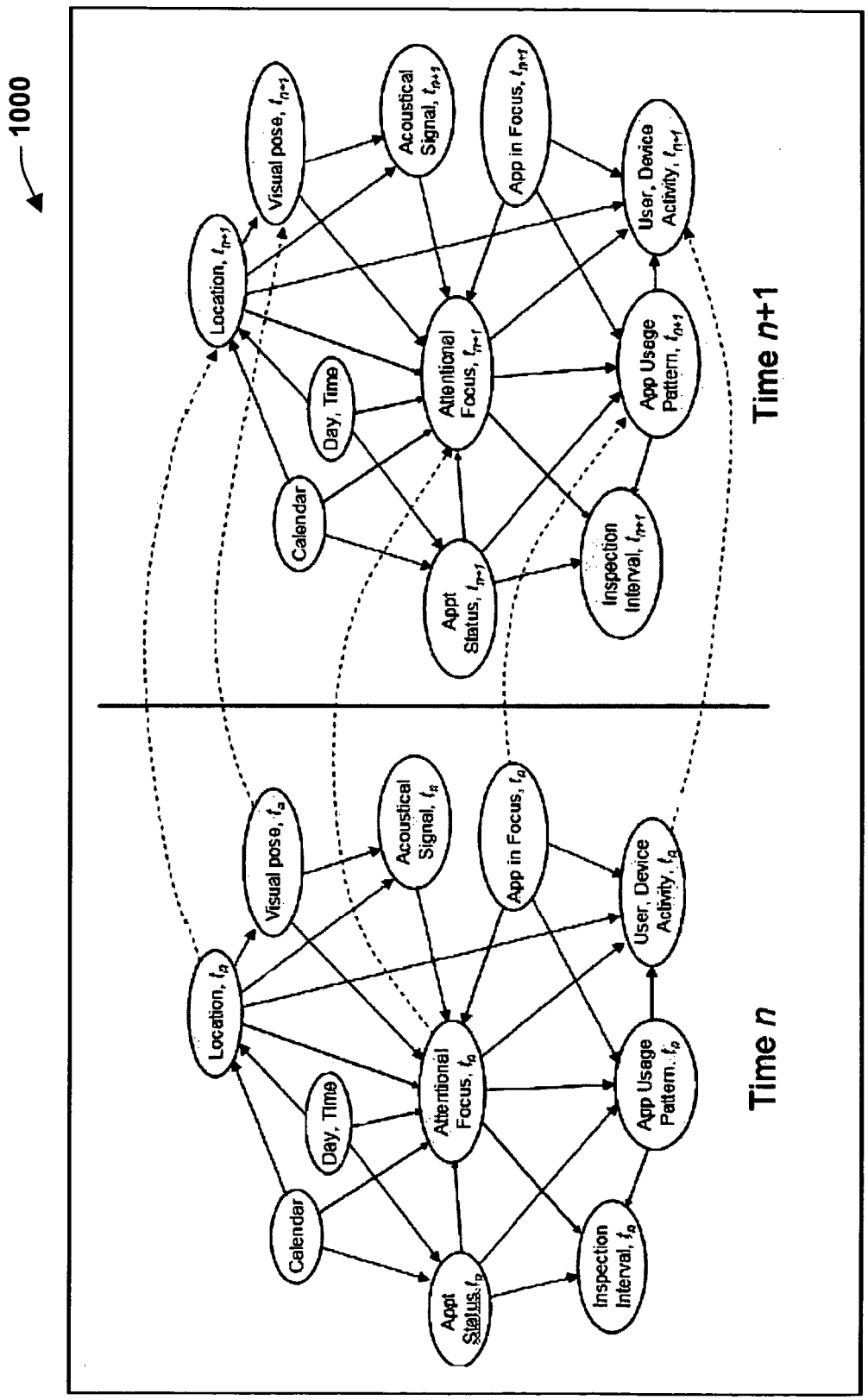
FIG. 10 is an influence diagram illustrating a temporal Bayesian attentional model in accordance with an aspect of the present invention.

FIG. 10 illustrates a temporal Bayesian attentional model 1000, highlighting key dependencies (dashed arcs) between variables in adjacent time slices. The model 1000 displays two adjacent time slices of a temporal attentional model. Such a model provides a probability distribution over a user's workload and task that was developed for an application that provides selective filtering of messages and communications to users. In this case, the status of attention includes approximately 15 discrete states (can include more or less states).

Figure 11:
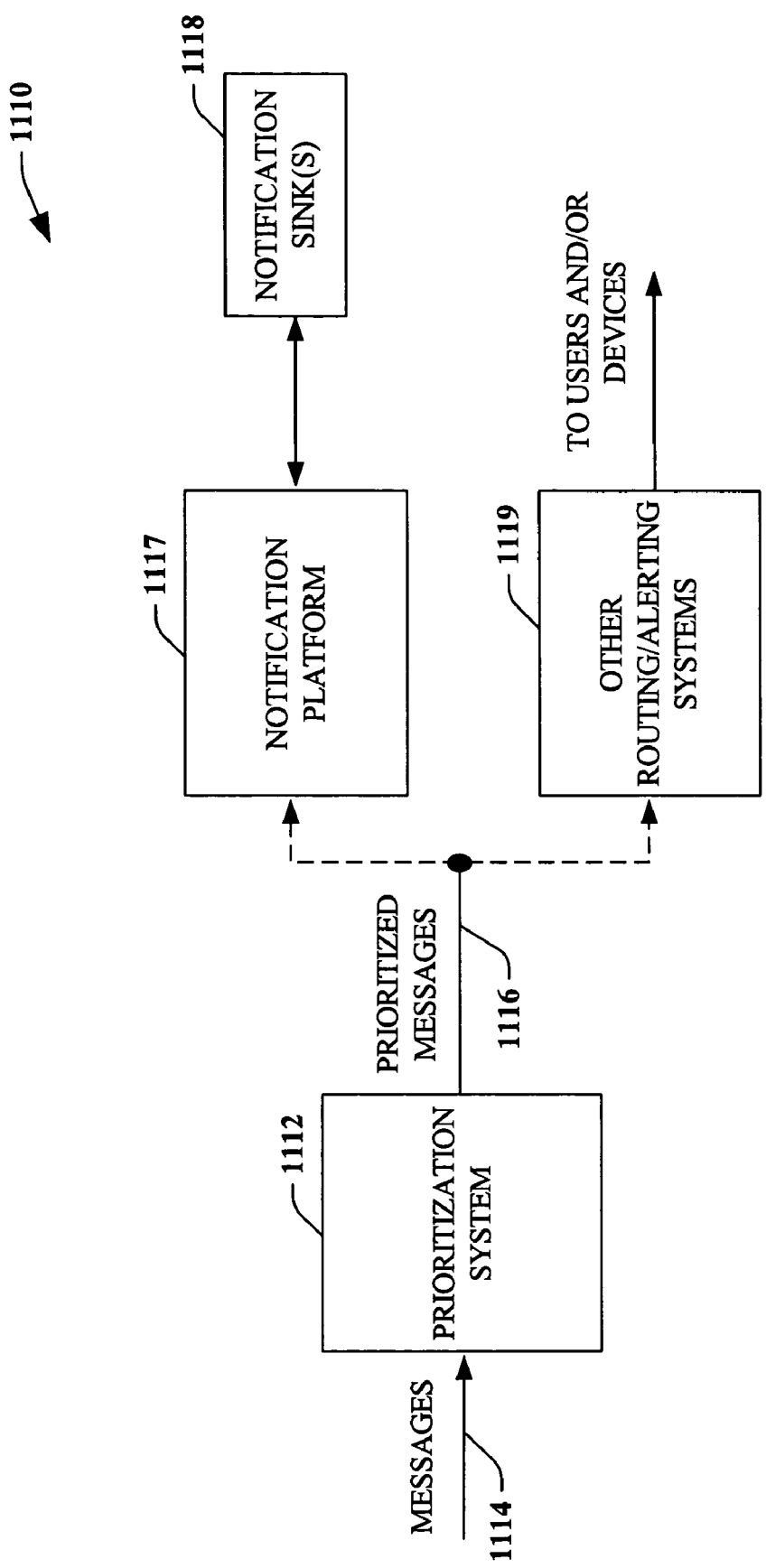
FIG. 11 is a schematic block diagram of a prioritization system in accordance with an aspect of the present invention.

Referring to FIG. 11, a system 1110 illustrates a prioritization system 1112 and notification architecture in accordance with an aspect of the present invention. The prioritization system 1112 receives one or more messages or notifications 1114, generates a priority or measure of importance (e.g., probability value that the message is of a high or low importance) for the associated message, and provides the one or more messages with an associated priority value at an output 1116. As will be described in more detail below, classifiers can be constructed and trained to automatically assign measures of prioritization to the messages 1114. For example, the output 1116 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 1117 can be employed in conjunction with the prioritization system 1112 to direct prioritized messages to one or more notification sinks accessible to users. As will be described in more detail below, the notification platform 1117 can be adapted to receive the prioritized messages 1116 and make decisions regarding when, where, and how to notify the user, for example. As an example, the notification platform 1117 can determine a communications modality (e.g., current notification sink 1118 of the user such as a cell phone, or Personal Digital Assistant (PDA)) and likely location and/or likely focus of attention of the user. If a high importance e-mail were received, for example, the notification platform 1117 can determine the users location/focus and direct/reformat the message to the notification sink 1118 associated with the user. If a lower priority message 1116 were received, the notification platform 1117 can be configured to leave the e-mail in the user's in-box for later review as desired, for example. As will be described in more detail below, other routing and/or alerting systems 1119 may be utilized to direct prioritized messages 1116 to users and/or other systems.

Figure 12:
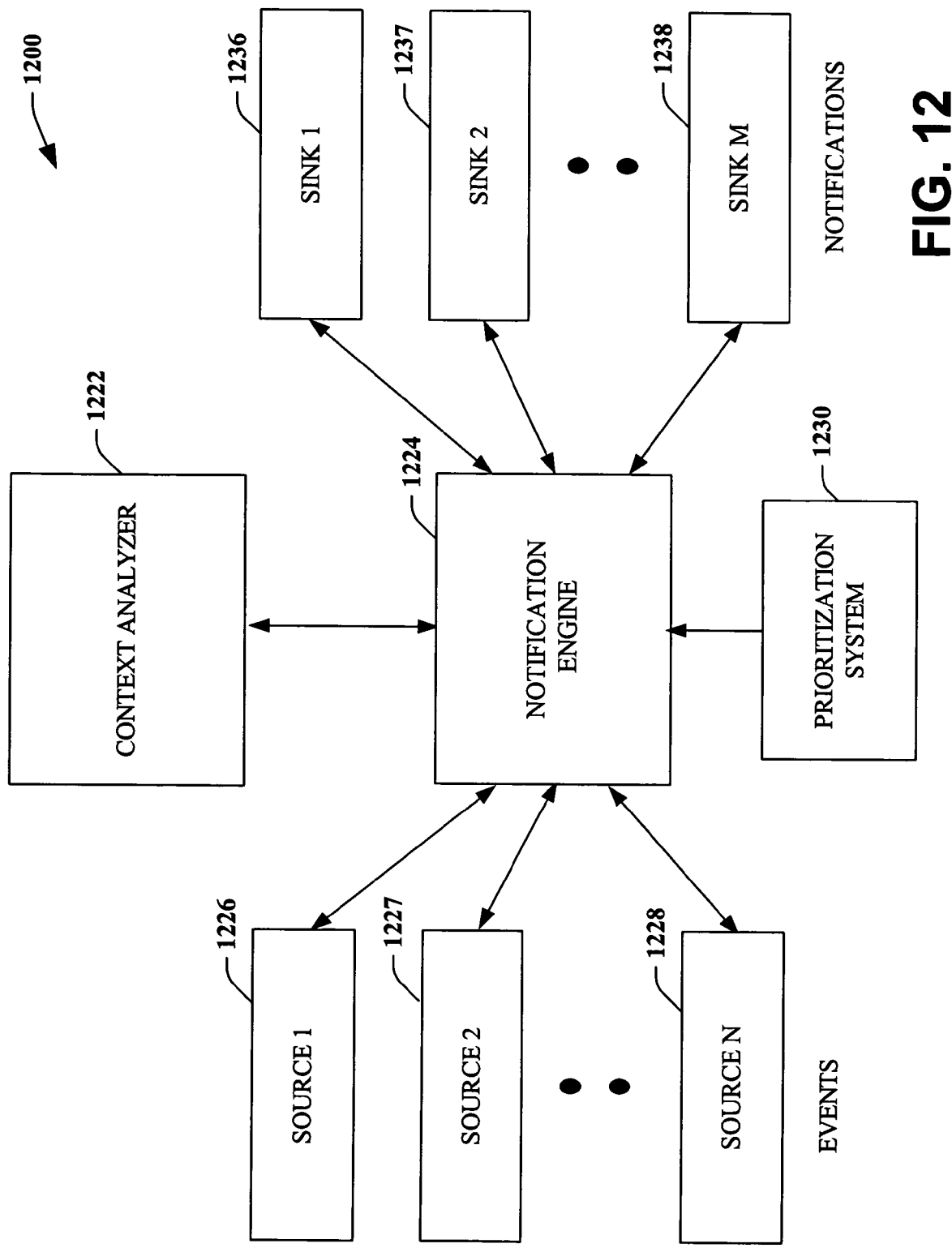
FIG. 12 is a schematic block diagram illustrating systematic cooperation between a notification engine and a context analyzer according to an aspect of the present invention.

Turning now to FIG. 12, a system 1200 illustrates how a notification engine and context analyzer function together according to an aspect of the present invention. The system 1200 includes a context analyzer 1222, a notification engine 1224, one or more notification sources 1 through N, 1226, 1227, 1228, a prioritization system 1230, which can operate as a notification source, and one or more notification sinks, 1 through M, 1236, 1237, 1238, wherein N an M are integers, respectively. The sources are also referred to as event publishers, while the sinks are also referred to as event subscribers. There can be any number of sinks and sources. In general, the notification engine 1224 conveys notifications, which are also referred to as events or alerts, from the sources 1226-1228 to the sinks 1236-1238, based in part on parametric information stored in and/or accessed by the context analyzer 1222.

The context analyzer 1522 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 1224, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 1222, according to one aspect of the present invention is inclusive of contextual information determined by the analyzer. The contextual information is determined by the analyzer 1222 by discerning the user's location and attentional status based on one or more contextual information sources (not shown), as is described in more detail in a later section of the description. The context analyzer 1222, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 1226-1228, 1230 generate notifications intended for the user and/or other entity. For example, the sources 1226-1228 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the prioritization system 1230 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 1226-1228 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
  computer systems (e.g., that may alert the user with messages that information about alerts about system activity or problems);
  Internet-related services, appointment information, scheduling queries;
  changes in documents or numbers of certain kinds of documents in one or more shared folders;
  availability of new documents in response to standing or persistent queries for information; and/or,
  information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 1236-1238 are able to provide notifications to the user. For example, such notification sinks 1236-1238 can include computers, such as desktop and/or laptop computers, handheld computers, cell phones, landline phones, pagers, automotive-based computers, as well as other systems/applications as can be appreciated. It is noted that some of the sinks 1236-1238 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 1224 accesses the information stored and/or determined by the context analyzer, and determines which of the notifications received from the sources 1226-1228 to convey to which of the sinks 1236-1238. Furthermore, the notification engine 1224 can determine how the notification is to be conveyed, depending on which of the sinks 1236-1238 has been selected to send the information to. For example, it may be determined that notifications should be summarized before being provided to a selected sinks 1236-1238.

The invention is not limited to how the engine 1224 makes its decisions as to which of the notifications to convey to which of the notification sinks, and in what manner the notifications are conveyed. In accordance with one aspect, a decision-theoretic analysis can be utilized. For example, the notification engine 1224 can be adapted to infer important uncertainties about variables including a user's location, attention, device availability, and amount of time until the user will access the information if there were no alert. The notification engine 1224 can then make notification decisions about whether to alert a user to a notification, and if so, the nature of the summarization and the suitable device or devices to employ for relaying the notification. In general, the notification engine 1224 determines the net expected value of a notification. In doing so, it can consider the following:

the fidelity and transmission reliability of each available notification sink;
the attentional cost of disturbing the user;
the novelty of the information to the user;
the time until the user will review the information on his or her own;
the potentially context-sensitive value of the information; and/or,
the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 1224 can make decisions as to one or more of the following:

what the user is currently attending to and doing (based on, for example, contextual information);
where the user currently is;
how important the information is;
what is the cost of deferring the notification;
how distracting would a notification be;
what is the likelihood of getting through to the user; and,
what is the fidelity loss associated with the use of a specific mode of a given notification sink.

Therefore, the notification engine 1224 can perform an analysis, such as a decision-theoretic analysis, of pending and active notifications, evaluates context-dependent variables provided by information sinks and sources, and infers selected uncertainties, such as the time until a user is likely to review information and the user's location and current attentional state. Furthermore, the notification engine 1224 can access information stored in a user profile by the context analyzer 1222 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 1224 determines how and whether to notify the user. to one aspect of the present invention, the notification platform architecture 1500 can be configured as a layer that resides over an eventing or messaging infrastructure. However, the invention is not limited to any particular eventing infrastructure.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks such as endpoint devices receive notifications, alerts and events, for example. The present invention is not so limited, however.

Figure 13:
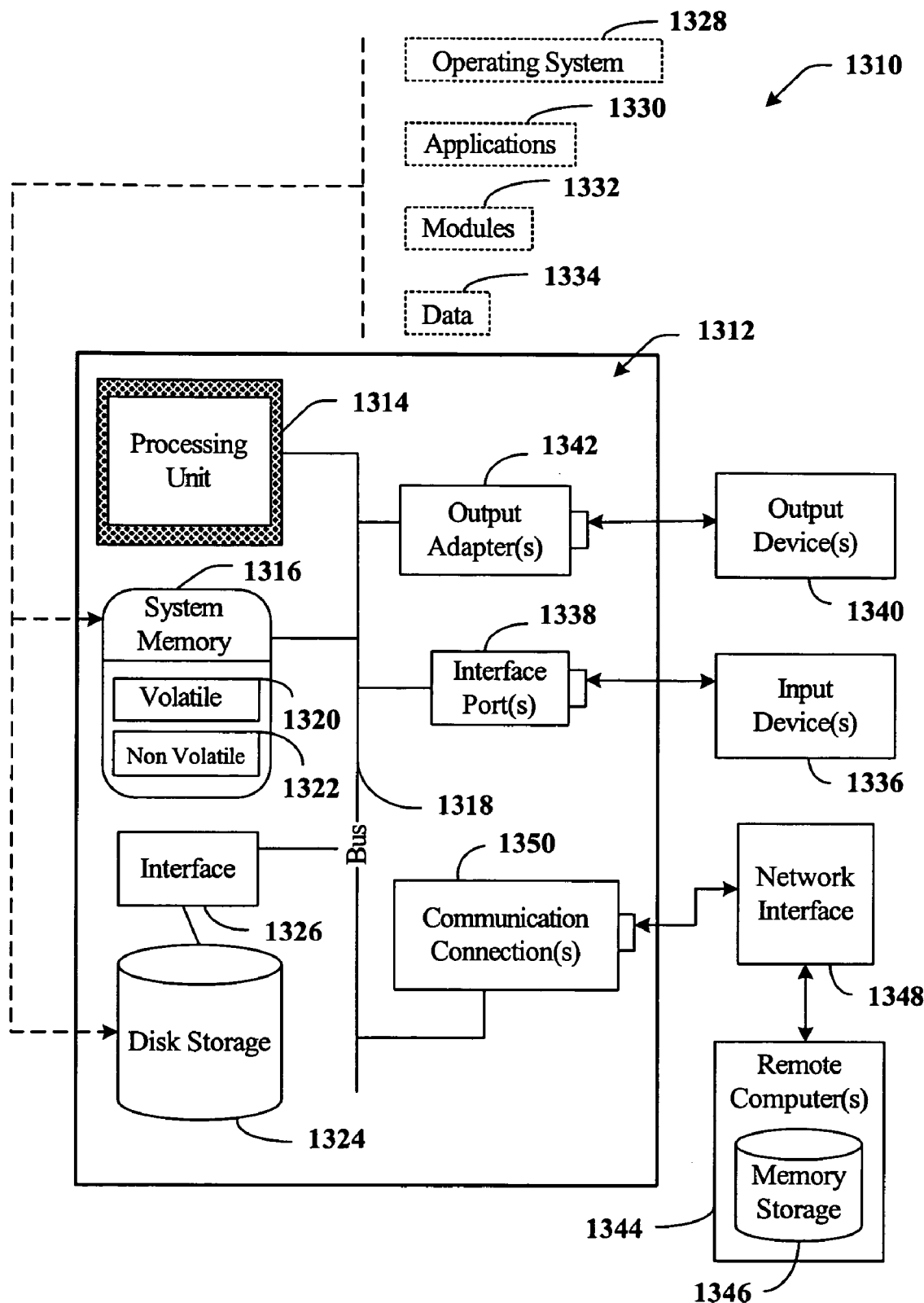
FIG. 13 is a schematic block diagram illustrating a suitable operating environment in accordance with an aspect of the present invention.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
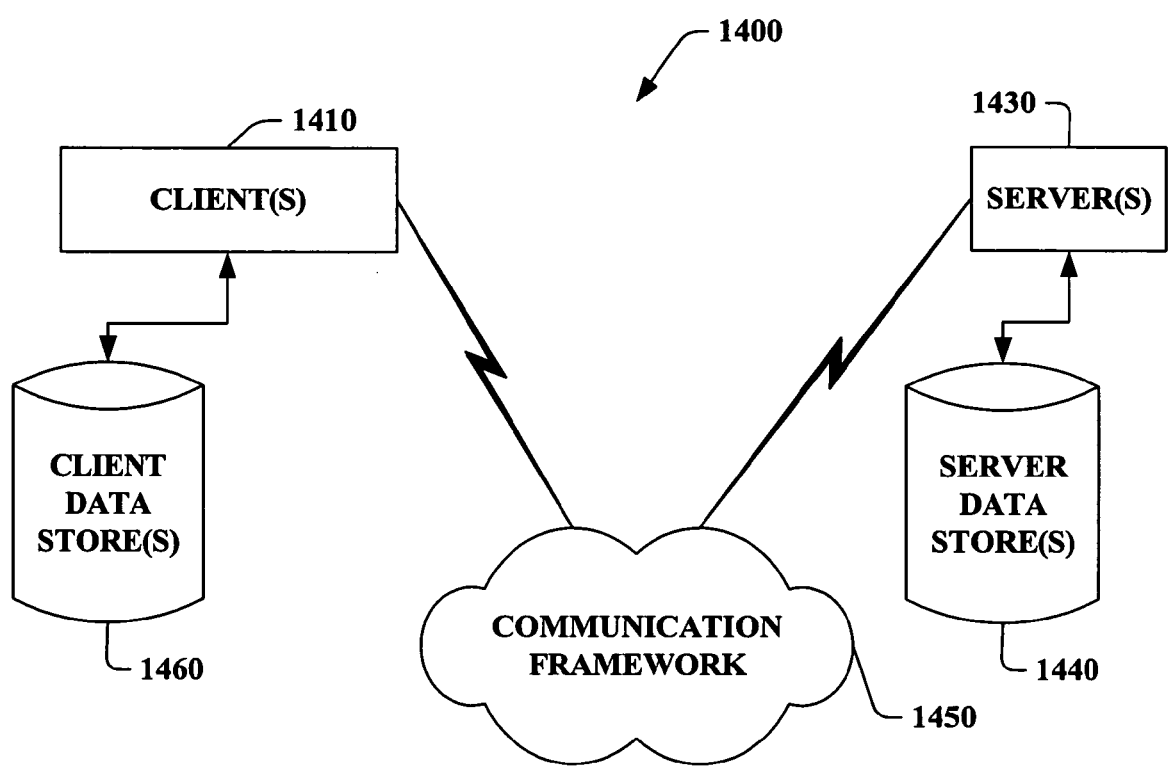
FIG. 14 is a schematic block diagram of a sample-computing environment with which the present invention can interact.

FIG. 14 is a schematic block diagram of a sample-computing environment 1400 with which the present invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the present invention, for example. One possible communication between a client 1410 and a server 1430 may be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system that facilitates conveying notifications, comprising:
   at least one processor; and
   at least one memory, communicatively coupled to the at least one processor and containing computer-readable instructions that, when executed by the at least one processor, perform the following steps:
   receiving a message, wherein the message comprises a time-to-live (TTL) parameter that specifies a period of time the message is active;
   upon storing the message in a queue, determining an availability status of a recipient, wherein the availability status of the recipient comprises at least one of: a busy status and a free status; and
   upon determining that the availability status of the recipient is a busy status and determining that the message is active, selecting an appropriate action based on a recipient unavailable policy, the appropriate action comprising one or more of:
      sending an automated message to a sender of the message specifying an amount of time that the recipient will be busy;
      converting the message to an email thread and sending the email thread to an email inbox of the recipient;
      delivering the message to the recipient upon determining that the message satisfies an exception, wherein delivering the message comprises determining a most appropriate time during the period of time the message is active to deliver the message using one or more of: a statistical-based method, a probabilistic-based method, and a utility-based method; and
      executing the selected action; and
   upon determining that the availability status of the recipient is a free status and determining that the message is active, sending the message to the recipient.

2. The computer system of claim 1, further comprising receiving the message from one or more of: a communications component, an instant messaging system, a wired telephone, a cell phone, and an email component.

3. The computer system of claim 1, further comprising receiving the message at a voice mail component.

4. The computer system of claim 1, wherein the message comprises one or more additional parameters, and wherein the one or more additional parameters control at least one of: how the message is sent to the recipient, when the message is sent to the recipient, and to which recipient device of one or more recipient devices the message is sent.

5. The computer system of claim 1, wherein when the message remains in the queue longer than the TTL period, the message is withdrawn from the queue without sending to the recipient.

6. The computer system of claim 1, wherein the computer system comprises at least one of: a client and a server, and wherein the computer system is associated with at least one of: the sender and the recipient of the message.

7. The computer system of claim 1, further comprising a user interface that is employed to configure the TTL parameter and to compose the message.

8. The computer system of claim 1, further comprising:
   automatically analyzing the message for one or more of:
      voice queues and textual queues that indicate how long the message should remain active before withdrawal; and
   automatically configuring the TTL parameter.

9. The computer system of claim 1, wherein the busy status comprises one or more unavailable states, and wherein one or more unavailable states are determined via a bounded deferral component.

10. The computer system of claim 1, further comprising sending data in addition to the message between at least one of: the sender and the recipient.

11. The computer system of claim 10, the additional data further comprising a message received confirmation that is sent to the sender when the message is rendered to the recipient.

12. The computer system of claim 10, the additional data comprising a message timed-out notification that is sent to the sender indicating that the message was not sent.

13. The computer system of claim 10, wherein the message is an urgent message, and wherein the TTL period is almost complete and the recipient's availability status is a busy status, the message is transmitted to the recipient rather than timing out.

14. The computer system of claim 10, wherein the additional data specifies a pending availability status of the recipient.

15. The computer system of claim 10, wherein the additional data includes at least one of an image of the sender and text associated with the sender that is sent to the recipient indicating that an instant message is in the queue from the sender.

16. The computer system of claim 1, further comprising an activity log that can be periodically checked by the recipient that indicates a number of messages sent, message content associated with each message of the number of messages sent, and sender identities of the senders that sent successful and timed-out messages to the recipient.

17. The computer system of claim 1, further comprising a bounded deferral period that relates to a deadline for making the recipient aware of the message, wherein the message contains information of value to the recipient, and wherein a deferral is dependent on an urgency of the information.

18. The computer system of claim 17, wherein the bounded deferral period is associated with at least one detector comprising: one or more sensors, calendar information, an alerting type, and a time of day; and wherein the at least one detector is configured to determine a current availability status for the recipient and an availability status at a predetermined time in the future for the recipient.

19. The computer system of claim 1, further comprising sensors that determine a current cost of interruption for the recipient.

20. The computer system of claim 1, further comprising a prioritization system, wherein a bounded deferral period is a function of at least one of: an inferred urgency of the message, a priority of the message, and an identity of the sender of the message.

21. The computer system of claim 1, wherein receiving the message comprises storing the message in the queue.

22. A computer storage medium not consisting of a propagated data signal and having computer executable instructions stored thereon for performing a method of providing a message to a recipient, the method comprising:
   receiving a message, wherein the message comprises a time-to-live (TTL) period that specifies a length of time before the message expires;
   upon storing the message in a queue, determining an availability status of the recipient, wherein the availability status of the recipient comprises at least one of: a busy status and a free status; and upon determining that the recipient's availability status is a busy status and determining that the message has not expired, selecting an appropriate action based on a recipient unavailable policy, the appropriate action comprising one or more of:
  sending an automated message to a sender of the message indicating an amount of time that the recipient will be busy;
  converting the message to an email thread and sending the email thread to an email inbox of the recipient;
  delivering the message to the recipient upon determining that the message satisfies an exception, wherein delivering the message comprises determining a most appropriate time during the time before the message expires to deliver the message using one or more of: a statistical-based method, a probabilistic-based method, and a utility-based method; and
  executing the selected action; and
upon determining that the availability status of the recipient is a free status and determining that the message has not expired, sending the message to the recipient.

23. The computer storage medium of claim 22, wherein the busy status comprises one or more unavailable states.

24. The computer storage medium of claim 22, wherein it is determined that the recipient's availability status will be a busy status during the entire TTL period using one or more of: an endpoint sensor, recipient calendar information, and recipient patterns of availability.

25. A computer-implemented method for providing a message to a recipient when the recipient is available to receive the message, the method comprising:
  receiving a message from a computing device, wherein the message comprises a time-to-live (TTL) period that specifies a length of time the message is active;
  upon storing the message in a queue, determining an availability status of a recipient, wherein the availability status of the recipient comprises at least one of: a busy status and a free status;
  upon determining that the availability status of the recipient is a busy status and determining that the message is active, selecting an appropriate action based on a recipient unavailable policy, the appropriate action comprising one or more of:
    sending an automated message to a sender of the message indicating an amount of time that the recipient will be busy;
    converting the message to an email thread and sending the email thread to an email inbox of the recipient;
    delivering the message to the recipient upon determining that the message satisfies an exception, wherein delivering the message comprises determining a most appropriate time during the period of time the message is active to deliver the message using one or more of: a statistical-based method, a probabilistic-based method, and a utility-based method; and
    executing the selected action; and
  upon determining that the availability status of the recipient is a free status and determining that the message is active, sending the message to the recipient.

26. The computer-implemented method of claim 25, wherein determining the most appropriate time during the TTL period comprises using one or more sensors associated with an endpoint device of the recipient.

27. The computer system of claim 1, wherein delivering the message upon determining that the message satisfies an exception further comprises one or more of:
  determining that the message is urgent;
  determining that the sender of the message is on a preferred list; and
  determining that the message refers to high priority information.

28. The computer storage medium of claim 22, wherein delivering the message upon determining that the message satisfies an exception further comprises one or more of:
  determining that the message is urgent;
  determining that the sender of the message is on a preferred list; and
  determining that the message refers to high priority information.

* * * * *